United States Patent
Kasamatsu

(10) Patent No.: US 7,390,002 B2
(45) Date of Patent: *Jun. 24, 2008

(54) SUSPENSION SYSTEM OF VEHICLE

(75) Inventor: Akira Kasamatsu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 248 days.

This patent is subject to a terminal disclaimer.

(21) Appl. No.: 10/547,369

(22) PCT Filed: Mar. 4, 2004

(86) PCT No.: PCT/JP2004/002778

§ 371 (c)(1),
(2), (4) Date: Aug. 29, 2005

(87) PCT Pub. No.: WO2004/080734

PCT Pub. Date: Sep. 23, 2004

(65) Prior Publication Data

US 2006/0151964 A1 Jul. 13, 2006

(30) Foreign Application Priority Data

Mar. 12, 2003 (JP) ............................. 2003-066435

(51) Int. Cl.
B60G 17/056 (2006.01)
B60G 21/06 (2006.01)

(52) U.S. Cl. ..................... 280/124.159; 280/5.506; 280/124.161; 280/5.507

(58) Field of Classification Search ............ 280/5.509, 280/5.508, 5.507, 5.504, 5.506, 124.161, 280/124.16, 124.158, 124.159, 124.157, 280/124.106, 124.103, 124.1; 251/63, 63.5

See application file for complete search history.

(56) References Cited

U.S. PATENT DOCUMENTS 3,356,954 A * 12/1967 Gottschalk ........... 280/124.161

(Continued)

FOREIGN PATENT DOCUMENTS

EP 0 963 868 A1 12/1999

(Continued)

OTHER PUBLICATIONS

"Monroe KSS, Un Antiroulis Autonome," Revue Technique Automobile, ETAI. Boulogne-Billancourt, Fr., vol. 54, No. 620, Special, pp. 48. Sep. 1999.

Primary Examiner—Eric Culbreth
Assistant Examiner—Karen Amores
(74) Attorney, Agent, or Firm—Oliff & Berridge, PLC

(57) ABSTRACT

In a suspension system (20) for use in a vehicle including a body, left and right front wheels (10), and left and right rear wheels (12), a front-wheel-associated cylinder device (52) which controls a relative displacement of the left and right front wheels, and a rear-wheel-associated cylinder device (62) which controls a relative displacement of the left and right rear wheels are associated with each other with a working fluid. A first-chamber-associated valve (190) is provided in a first-chamber-associated passage (90) which connects between respective first chambers (74) of the front-wheel-associated cylinder device and the rear-wheel-associated cylinder device, such that the first-chamber-associated valve is located between the first chamber of the front-wheel-associated cylinder device and a first fluid accommodating device (200).

25 Claims, 12 Drawing Sheets

U.S. PATENT DOCUMENTS

| | | | | |
|---|---|---|---|---|
| 3,442,502 | A * | 5/1969 | Fischer et al. | 267/64.16 |
| 3,550,993 | A * | 12/1970 | Peiffer | 280/6.159 |
| 3,970,327 | A | 7/1976 | Dezelan | |
| 4,478,431 | A * | 10/1984 | Muller et al. | 280/6.159 |
| 5,193,845 | A * | 3/1993 | Yokote et al. | 280/5.503 |
| 5,601,306 | A | 2/1997 | Heyring | |
| 6,179,310 | B1 * | 1/2001 | Clare et al. | 280/124.159 |
| 6,217,047 | B1 * | 4/2001 | Heyring et al. | 280/124.106 |
| 6,840,279 | B2 * | 1/2005 | Sulzyc et al. | 137/636.1 |
| 7,055,831 | B2 * | 6/2006 | Brandenburger | 280/5.504 |
| 7,055,832 | B2 * | 6/2006 | Germain | 280/5.508 |
| 7,168,720 | B2 * | 1/2007 | Fontdecaba Buj | 280/124.159 |
| 7,234,707 | B2 * | 6/2007 | Green et al. | 280/5.511 |
| 2004/0090019 | A1 * | 5/2004 | Germain | 280/5.502 |
| 2004/0094929 | A1 * | 5/2004 | Ribi | 280/124.161 |
| 2005/0001401 | A1 * | 1/2005 | Heyring et al. | 280/124.157 |
| 2005/0139796 | A1 * | 6/2005 | Altonji | 251/63.5 |
| 2005/0225048 | A1 * | 10/2005 | Kasamatsu | 280/124.16 |
| 2005/0269534 | A1 * | 12/2005 | Tanikawa et al. | 251/63.5 |
| 2005/0280237 | A1 * | 12/2005 | Stacey et al. | 280/124.16 |
| 2006/0065868 | A1 * | 3/2006 | Strong | 251/63.5 |
| 2006/0113120 | A1 * | 6/2006 | Radke et al. | 180/9.5 |
| 2006/0142916 | A1 * | 6/2006 | Onuma et al. | 701/38 |
| 2006/0151969 | A1 * | 7/2006 | Revill et al. | 280/124.106 |
| 2006/0237942 | A1 * | 10/2006 | Munday et al. | 280/124.157 |

FOREIGN PATENT DOCUMENTS

| | | |
|---|---|---|
| EP | 1 103 395 A2 | 5/2001 |
| EP | 1103395 A2 * | 5/2001 |
| JP | A 7-500548 | 1/1995 |
| JP | A 11-510761 | 9/1999 |
| JP | A 2002-541014 | 12/2002 |
| JP | A 2002-541015 | 12/2002 |
| JP | A 2003-080917 | 3/2003 |
| WO | WO 93/01063 A1 | 1/1993 |
| WO | WO 97/06971 A1 | 2/1997 |
| WO | WO 00/61393 A1 | 10/2000 |
| WO | WO 00/61394 A1 | 10/2000 |
| WO | WO 01/21423 A1 | 3/2001 |
| WO | WO 02/055327 A1 | 7/2002 |

* cited by examiner

COMPARATIVE EXAMPLE

SUSPENSION SYSTEM OF VEHICLE

TECHNICAL FIELD

The present invention relates to a suspension system for use in a vehicle such that the suspension system is provided between a body and wheels (i.e., left and right front wheels and left and right rear wheels) of the vehicle, and particularly to improvements of construction of the suspension system.

BACKGROUND ART

There is known a suspension apparatus for use in a vehicle such that the suspension apparatus is provided between a body and four wheels of the vehicle. An example of an improved suspension apparatus is disclosed in, e.g., Japanese Patent Publication JP-A 11-510761.

The above-indicated Patent Publication discloses a conventional suspension apparatus in which a front-wheel-associated cylinder device and a rear-wheel-associated cylinder device are associated with each other by a first-chamber-associated passage, a second-chamber-associated passage, and a working fluid.

More specifically described, the front-wheel-associated cylinder device controls a relative displacement between the left and right front wheels in upward and downward directions of the body of the vehicle and, to this end, includes a housing and a piston fitted in the housing to divide an inner room of the housing into a first (e.g., an upper) fluid chamber and a second (e.g., a lower) fluid chamber.

Likewise, the rear-wheel-associated cylinder device controls a relative displacement between the left and right rear wheels in the upward and downward directions of the vehicle body and, to this end, includes a housing and a piston fitted in the housing to divide an inner room of the housing into a first fluid chamber and a second fluid chamber which correspond to the first and second fluid chambers of the front-wheel-associated cylinder device, respectively.

When the body of the vehicle rolls in one direction, respective pressures in the respective first fluid chambers of the front-wheel-associated and rear-wheel-associated cylinder devices change in a same direction, i.e., increase, or decrease. Likewise, when the vehicle body rolls in that direction, respective pressures in the respective second fluid chambers of the two cylinder devices change in a same direction, i.e., decrease, or increase.

The first-chamber-associated passage connects between the respective first fluid chambers of the front-wheel-associated and rear-wheel-associated cylinder devices and, likewise, the second-chamber-associated passage connects between the respective second fluid chambers of the two cylinder devices.

Thus, in the conventional suspension apparatus, the front-wheel-associated and rear-wheel-associated cylinder devices are connected to each other by the two passages, and the thus obtained pressure circuit is filled with the working fluid. The working fluid is preferably provided by a liquid that is incompressible in its natural state, but may be provided by a gas whose compressibility is considerably low, such as high-pressure gas.

When respective pressures in the two cylinder devices are substantially equal to each other, the working fluid is restrained from flowing between the two cylinder devices. Consequently the working fluid behaves as a rigid body, so that respective displacements of the respective pistons of the two cylinder devices are both restrained. This leads to improving not only a rolling rigidity of the vehicle body, but also a turning performance of the vehicle and the driver's steering feeling.

On the other hand, when respective pressures in the two cylinder devices are not equal to each other, the working fluid is allowed to flow between the two cylinder devices. Consequently the working fluid behaves as a soft body, so that the respective displacements of the respective pistons of the two cylinder devices are both allowed. This leads to improving articulation properties of the suspension apparatus, e.g., the property of allowing each wheel to displace quickly to follow irregularity of road surface, and the property of decreasing, when one of the left-side front and rear wheels, or one of the right-side front and rear wheels bounces, the change of sum of respective tread loads of all the wheels, or restraining the other wheel from bouncing. In addition, this leads to improving not only the driver's driving feelings, e.g., feeling of "flatness" and/or "heaviness" of the body when the vehicle is running, but also an off-road running performance of the vehicle.

Thus, the conventional suspension apparatus can automatically adjust the suspension properties of the vehicle. However, generally, every industrial product is desired to have a higher reliability.

DISCLOSURE OF THE INVENTION

It is therefore an object of the present invention to provide a suspension system which enjoys a higher reliability.

This object may be achieved according to any of the following modes of the present invention in the form of a suspension system, each of which is numbered like the appended claims and may depend from the other mode or modes, where appropriate, to indicate and clarify possible combinations of technical features. It is, however, to be understood that the present invention is not limited to the technical features or any combinations thereof that will be described below for illustrative purposes only.

(1) A suspension system for use in a vehicle including a body, left and right front wheels, and left and right rear wheels, the system comprising:

a front-wheel-associated cylinder device which controls a relative displacement between the left and right front wheels in upward and downward directions, and which includes a housing and a piston fitted in the housing to divide an inner room of the housing into a first fluid chamber and a second fluid chamber;

a rear-wheel-associated cylinder device which controls a relative displacement between the left and right rear wheels in the upward and downward directions, and which includes a housing and a piston fitted in the housing to divide an inner room of the housing into a first fluid chamber and a second fluid chamber which correspond to the first and second fluid chambers of the front-wheel-associated cylinder device, respectively;

a first-chamber-associated passage which connects between the respective first fluid chambers of the front-wheel-associated and rear-wheel-associated cylinder devices;

a second-chamber-associated passage which connects between the respective second fluid chambers of the front-wheel-associated and rear-wheel-associated cylinder devices;

at least one fluid accommodating device which is connected to the first-chamber-associated passage at a first connection point, and is connected to the second-chamber-associated passage at a second connection point, and which can accommodate an amount of a working fluid present in the first-chamber-associated and second-chamber-associated passages and the front-wheel-associated and rear-wheel-associated cylinder devices, the first-chamber-associated passage including two portions located on opposite sides of the first connection point, respectively, the second-chamber-associated passage including two portions located on opposite sides of the second connection point, respectively;

a first-chamber-associated valve device which is selectively placed in a communication position to communicate the respective first fluid chambers of the front-wheel-associated and rear-wheel-associated cylinder devices, with each other, and a shut-off position to shut off the communication between said respective first fluid chambers;

a second-chamber-associated valve device which is selectively placed in a communication position to communicate the respective second fluid chambers of the front-wheel-associated and rear-wheel-associated cylinder devices, with each other, and a shut-off position to shut off the communication between said respective second fluid chambers; and the first-chamber-associated valve device being provided in one of the two portions of the first-chamber-associated passage that is nearer than the other portion to a first cylinder device as one of the front-wheel-associated and rear-wheel-associated cylinder devices, the second-chamber-associated valve device being provided in one of the two portions of the second-chamber-associated passage that is nearer than the other portion to a second cylinder device as the other of the front-wheel-associated and rear-wheel-associated cylinder devices.

According to this mode (1), the suspension system can be placed in a cylinder communication state in which the respective first fluid chambers of the front-wheel-associated cylinder device and the rear-wheel-associated cylinder device communicate with each other, and the respective second fluid chambers of the two cylinder devices communicate with each other.

In the cylinder communication state, when a pair of front and rear wheels of the vehicle that corresponds to one of left-hand and right-hand side portions of the body (i.e., the left-side front and rear wheels, or the right-side front and rear wheels) displace in a same direction by a same amount, respective pressures in the two first fluid chambers remain equal to each other, and respective pressures in the two second fluid chambers also remain equal to each other, so that the working fluid is prevented from flowing between the two first fluid chambers or between the two second fluid chambers. Thus, respective suspension rigidities of the same-side front and rear wheels are both increased and, eventually, those front and rear wheels are both restrained from further displacing. That is, a rolling rigidity of the body is increased.

In addition, in the cylinder communication state, if a pair of same-side (i.e., left-side, or right-side) front and rear wheels displace in different directions, or displace in a same direction but by different amounts, respective pressures in the two first fluid chambers cannot remain equal to each other and respective pressures in the two second fluid chambers cannot remain equal to each other, either, so that the working fluid flows between the two first fluid chambers and between the two second fluid chambers. Thus, the respective suspension rigidities of the same-side front and rear wheels are both decreased and, eventually, the front and rear wheels are both allowed to displace further.

Generally, when the vehicle turns, the same-side front and rear wheels displace in a same direction, and the body tends to roll. Notwithstanding, the suspension system according to this mode (1) assures that the respective suspension rigidities of the front and rear wheels are both increased and accordingly the rolling rigidity of the body is also increased. Thus, the vehicle body can be effectively restrained from rolling.

When the vehicle runs on a rough road surface, the same-side front and rear wheels tend to displace in different directions and/or by different amounts. Against this tendency, the suspension system according this mode (1) assures that the respective suspension rigidities of the front and rear wheels are both decreased and accordingly respective articulation properties of the front and rear wheels are improved.

However, when the vehicle turns, the same-side front and rear wheels do not always displace in a same direction and by a same amount. For example, when the vehicle turns while being subjected to a great centrifugal force, because of its somewhat too short turning radius and/or its somewhat too high running velocity, the same-side front and rear wheels may tend to displace in different manners (e.g., in different directions and/or by different amounts).

When the vehicle turns with the great centrifugal force, it is ideal to increase both the respective suspension rigidities of the front and rear wheels and thereby increase the rolling rigidity of the body. However, when the same-side front and rear wheels displace in the different manners, the front and rear wheels are both allowed to behave like when the vehicle runs on the rough road surface, so that the rolling rigidity of the body may not be increased.

Hence, when the vehicle turns with the great centrifugal force, it is desirable to take a special measure to increase, against the above-indicated tendency in which the same-side front and rear wheels displace in the different manners, the respective suspension rigidities of the front and rear wheels and thereby increase the rolling rigidity of the vehicle body.

As the above-indicated special measure, the present suspension system employs the first-chamber-associated valve device which is selectively placed in the communication position to communicate the respective first fluid chambers of the front-wheel-associated and rear-wheel-associated cylinder devices, with each other, and the shut-off position to shut off the communication between the respective first fluid chambers; and the second-chamber-associated valve device which is selectively placed in the communication position to communicate the respective second fluid chambers of the front-wheel-associated and rear-wheel-associated cylinder devices, with each other, and the shut-off position to shut off the communication between the respective second fluid chambers.

Therefore, in the present suspension system, the respective first fluid chambers of the front-wheel-associated and rear-wheel-associated cylinder devices can be selectively disconnected from each other; and the respective second fluid chambers of the two cylinder devices can be selectively disconnected from with each other.

Thus, in one example of the present suspension system, when the vehicle runs and the same-side front and rear wheels tend to displace in different manners from each other, the front-wheel-associated cylinder device and the rear-wheel-associated cylinder device can be disconnected from each other, so that the respective suspension rigidities of the front and rear wheels may both be increased and accordingly the rolling rigidity of the vehicle body may also be increased.

Meanwhile, the suspension system according to this mode (1) is conceptually illustrated in FIG. 9. In the figure, the first-chamber-associated valve device 400 is provided in one of the two portions of the first-chamber-associated passage 402 that are located on opposite sides of a connection point CP1, respectively, where the first-chamber-associated passage 402 is connected to a first fluid accommodating device 404, the one portion being nearer to the first cylinder device 406 as one of the front-wheel-associated cylinder device 406 and the rear-wheel-associated cylinder device 408. That is, the first-chamber-associated valve device 400 is provided in the first-chamber-associated passage 402 connecting between the respective first fluid chambers 416 of the front-wheel-associated and rear-wheel-associated cylinder devices 406, 408, such that the first-chamber-associated valve device 400 is located between the first chamber 416 of the front-wheel-associated cylinder device 406 and the first fluid accommodating device 404.

In addition, the second-chamber-associated valve device 410 is provided in one of the two portions of the second-chamber-associated passage 412 that are located on opposite sides of a connection point CP2, respectively, where the second-chamber-associated passage 412 is connected to a second fluid accommodating device 414, the one portion being nearer to the second cylinder device 408 as the other of the front-wheel-associated and rear-wheel-associated cylinder devices 406, 408. That is, the second-chamber-associated valve device 410 is provided in the second-chamber-associated passage 412 connecting between the respective second fluid chambers 418 of the front-wheel-associated and rear-wheel-associated cylinder devices 406, 408, such that the second-chamber-associated valve 410 is located between the second chamber 418 of the second-wheel-associated cylinder device 408 and the second fluid accommodating device 414.

Thus, the suspension system according to this mode (1) has a first pressure circuit 420 connecting between the two first fluid chambers 416, 416, and a second pressure circuit 422 connecting between the two second fluid chambers 418, 418, and an overall pressure circuit of the present suspension system has a layout in which the first and second pressure circuits 420, 422 are point-symmetric with each other with respect to their essential functions.

As far as the present application is concerned, the term "point-symmetric" is not used, according to its mathematical strict definition, with respect to all elements (i.e., geometrical factors) of the overall pressure circuit of the suspension system. In fact, first, only such elements that have essential functions are conceptually selected from the overall pressure circuit of the suspension system, and then the term "point-symmetric" is applied to a conceptual layout (or a conceptual positional relationship) in which the thus selected elements are arranged.

Therefore, although the term "point-symmetric" is used, the present invention should not be limitedly construed such that that term is applied to all elements of the actual overall pressure circuit of the suspension system. Rather, the term "point-symmetric" should be applied to only the above-indicated conceptual layout in which the elements having the essential functions are arranged. For example, according to the present invention, it is not essentially required that respective actual positions and/or sizes of the two fluid accommodating devices 404, 414, the two cylinder devices 406, 408, the two passages 402, 412, or other elements be strictly point-symmetric with each other.

FIG. 12 conceptually shows a vehicle's suspension system as one comparative example. An overall pressure circuit of this comparative example has a conceptual layout in which a first pressure circuit 430 connecting between the two first fluid chambers 416, 416, and a second pressure circuit 432 connecting between the two second fluid chambers 418, 418 are line-symmetric with each other with respect to their essential functions.

More specifically described, in this comparative example, both the first-chamber-related valve device 400 and the second-chamber-related valve device 410 are connected to a same one of the front-wheel-associated cylinder device 406 and the rear-wheel-associated cylinder device 408 (i.e., the front-wheel-associated cylinder device 406 in the specific example shown in FIG. 12), directly, i.e., without via the connection points PC1, PC2 where the passages 402, 412 are connected to the fluid accommodating devices 404, 414, respectively.

Therefore, if, in this comparative example, a first failure mode in which the first-chamber-related valve device 400 continues to contain or lock up the working fluid in the first fluid chamber 416 of the front-wheel-associated cylinder device 406, and a second failure mode in which the second-chamber-related valve device 410 continues to contain or lock up the working fluid in the second fluid chamber 418 of the front-wheel-associated cylinder device 406 simultaneously occurs, a piston 440 cannot move in either direction in the cylinder device 406.

In contrast, in the suspension system according to this mode (1), exemplified as shown in FIG. 9, one 416 of the first and second fluid chambers 416, 418 of one 406 of the two cylinder devices 406, 408 is connected to one 400 of the two valve devices 400, 410, directly, i.e., without via one PC1 of the connection points PC1, PC2 where the passages 402, 412 are connected to the fluid accommodating devices 404, 414, respectively, and the other 418 of the first and second fluid chambers 416, 418 of the one cylinder device 406 is connected to the other 410 of the two valve devices 400, 410, indirectly, i.e., via the other PC2 of the connection points PC1, PC2; and one 416 of the first and second fluid chambers 416, 418 of the other cylinder device 408 is connected to the one 400 of the two valve devices 400, 410, indirectly, i.e., via the one PC1 of the connection points PC1, PC2, and the other 418 of the first and second fluid chambers 416, 418 of the other cylinder device 408 is connected to the other 410 of the two valve devices 400, 410, directly, i.e., without via the other PC2 of the connection points PC1, PC2.

Therefore, in the suspension system according to this mode (1), one of the first and second fluid chambers of each of the two cylinder devices is connected to one of the two valve devices in such a state in which the one fluid chamber communicates with one of the two fluid accommodating devices.

If, in the present suspension system, the above-indicated first and second failure modes simultaneously occur, the piston 440 can move in one of the opposite directions in each of the two cylinder devices 406, 408.

Thus, even if the above-indicated serious event might occur to the present suspension system, the highest pressure in each of the two cylinder devices is not increased so high as that in the comparative example shown in FIG. 12. Thus, the reliability of the present suspension system is improved.

According to this mode (1), each of the first-chamber-associated valve device and the second-chamber-associated valve device may be essentially provided by either a single valve or a combination of two or more valves.

In addition, according to this mode (1), each of the above-indicated two valve devices may be constructed to include either a movable element or a stationary element. One or more solenoid valves is or are one example of the former construction, and one or more mechanical valves is or are another example of the former construction; and one or more flow restrictors is or are one example of the latter construction.

Moreover, according to this mode (1), each of the above-indicated two valve devices is just required to be connected to one of the two fluid chambers of one of the two cylinder devices, such that the each valve device is located between the one fluid chamber of the one cylinder device and the at least one fluid accommodating device. Therefore, it is not essentially required that each valve device be connected to the corresponding fluid chamber via a passage having a substantial length. That is, each valve device may be directly attached to the corresponding fluid chamber.

In addition, according to this mode (1), the suspension system may employ one or more common front-wheel-associated cylinder devices that is or are commonly associated with the left and right front wheels, or two groups of individual front-wheel-associated cylinder devices that are associated with the two front wheels, respectively. In the former case, for example, a single common cylinder device may be commonly associated with the two front wheels; and, in the latter case, for example, two individual cylinder devices may be associated with the two front wheels, respectively. This construction is also true with the rear-wheel-associated cylinder device or devices of the suspension system according to this mode (1).

According to this mode (1), the suspension system may employ one or more fluid accommodating devices which, or each of which, can accommodate an amount of the working fluid under pressure.

According to this mode (1), the suspension system may employ the two cylinder devices each of which includes a housing having a bottom wall, a piston fitted in the housing, and a piston rod extending from one of opposite surfaces of the piston and projecting outward through an opposite wall of the housing that is opposite to the bottom wall thereof. In this case, the housing may be attached to a portion of the vehicle that is located on the side of the body, and the piston rod may be attached to a portion of the vehicle that is located on the side of the wheels. However, conversely, the housing may be attached to the side of the wheels, and the piston rod may be attached to the side of the body.

(2) The system according to the mode (1), wherein a conversion rate at which an amount of change of a volume of the first fluid chamber of the front-wheel-associated cylinder device is converted into an amount of displacement of a piston of the front-wheel-associated cylinder device, is smaller than a conversion rate at which an amount of change of a volume of the second-fluid chamber of the front-wheel-associated cylinder device is converted into an amount of displacement of the piston of the front-wheel-associated cylinder device, and wherein the first cylinder device comprises the front-wheel-associated cylinder device, so that the first-chamber-associated valve device is provided in said one portion of the first-chamber-associated passage that is nearer to the front-wheel-associated cylinder device.

In the suspension system according to the above-described mode (1), one of the two fluid chambers of each of the two cylinder devices is connected to one of the two valve devices, directly, i.e., without via either of the two connection points where the two passages are connected to the at least one fluid accommodating device.

If, in the above-indicated one fluid chamber of each cylinder device that is connected to the one valve device without via any of the connection points, the working fluid is locked up by the one valve device, and if, in this state, the temperature of the working fluid in the one fluid chamber increases, the working fluid thermally expands, and accordingly the volume of the fluid increases.

In the case where each cylinder device and the corresponding valve device are connected to each other via a passage having a substantial length, the working fluid present in that passage also thermally expands. In this case, therefore, the sum of respective increase amounts of the respective volumes of not only the working fluid in the one fluid chamber but also the working fluid in that passage is taken into consideration.

Thus, in each cylinder device, the piston is displaced by an amount corresponding to the increase amount of volume of the working fluid in the one fluid chamber. This causes some displacement of the corresponding wheel and, eventually, some inclination of the vehicle body. More specifically described, an actual neutral position of the piston is deviated from a nominal neutral position thereof.

Meanwhile, regarding a cylinder device in which a conversion rate at which an amount of change of volume of the first fluid chamber thereof is converted into an amount of displacement of the piston thereof is smaller than a conversion rate at which an amount of change of volume of the second fluid chamber thereof is converted into an amount of displacement of the piston thereof it is known that the amount of displacement of the piston, i.e., the amount of displacement of the wheel or the amount of inclination of the body, caused by a certain amount of change of volume of the first fluid chamber, is smaller than that caused by the same amount of change of volume of the second fluid chamber.

Based on the above-explained knowledge, in the suspension system according to this mode (2), the front-wheel-associated cylinder device is constructed such that a conversion rate (i.e., a volume-stroke conversion rate) at which an amount of change of volume of the first fluid chamber thereof is converted into an amount of displacement of the piston thereof is smaller than a conversion rate (i.e., a volume-stroke conversion rate) at which an amount of change of volume of the second fluid chamber thereof is converted into an amount of displacement of the piston thereof, and the first cylinder device comprises the front-wheel-associated cylinder device.

Therefore, in the present suspension system, the first fluid chamber of the first cylinder device that is connected to the first-chamber-associated valve device, directly, i.e., without via the connection point where the first-chamber-associated passage is connected to the at least one fluid accommodating device is provided by one of the first and second fluid chambers of the front-wheel-associated cylinder device that has the smaller volume-stroke conversion rate, i.e., whose volume change results in the smaller stroke of the piston, that is, the first fluid chamber of the front-wheel-associated cylinder device.

Therefore, even if the working fluid may be accidentally contained or locked up in the first fluid chamber of the front-wheel-associated cylinder device, the present suspension system can minimize the amount of deviation of the neutral position of the piston and, eventually, the amount of displacement of the front wheel or wheels or the amount of inclination of the vehicle body.

(3) The system according to the mode (1), wherein a conversion rate at which an amount of change of a volume of the first fluid chamber of the rear-wheel-associated cylinder device is converted into an amount of displacement of a piston of the rear-wheel-associated cylinder device, is smaller than a conversion rate at which an amount of change of a volume of the second fluid chamber of the rear-wheel-associated cylinder device is converted into an amount of displacement of the piston of the rear-wheel-associated cylinder device, and wherein the first cylinder device comprises the rear-wheel-associated cylinder device, so that the first-chamber-associated valve device is provided in said one portion of the first-chamber-associated passage that is nearer to the rear-wheel-associated cylinder device.

In the suspension system according to this mode (3), the rear-wheel-associated cylinder device is constructed such that a conversion rate (i.e., a volume-stroke conversion rate)

at which an amount of change of volume of the first fluid chamber thereof is converted into an amount of displacement of the piston thereof is smaller than a conversion rate (i.e., a volume-stroke conversion rate) at which an amount of change of volume of the second fluid chamber thereof is converted into an amount of displacement of the piston thereof, and the first cylinder device comprises the rear-wheel-associated cylinder device.

Therefore, in the present suspension system, the first fluid chamber of the first cylinder device that is connected to the first-chamber-associated valve device directly, i.e., without via the connection point where the first-chamber-associated passage is connected to the at least one fluid accommodating device is provided by one of the first and second fluid chambers of the rear-wheel-associated cylinder device that has the smaller volume-stroke conversion rate, i.e., whose volume change results in the smaller stroke of the piston, that is, the first fluid chamber of the rear-wheel-associated cylinder device.

Therefore, even if the working fluid may be accidentally locked up in the second fluid chamber of the rear-wheel-associated cylinder device, the present suspension system can minimize the amount of deviation of the neutral position of the piston and, eventually, the amount of displacement of the rear wheel or wheels or the amount of inclination of the vehicle body.

(4) The system according to any of the modes (1) to (3), further comprising:

a first-chamber-associated bypass passage which communicates the respective first fluid chambers of the front-wheel-associated and rear-wheel-associated cylinder devices, with each other, while substantially bypassing the first-chamber-associated valve device; and a second-chamber-associated bypass passage which communicates the respective second fluid chambers of the front-wheel-associated and rear-wheel-associated cylinder devices, with each other, while substantially bypassing the second-chamber-associated valve device.

In the suspension system according to any of the above-described modes (1) to (3), if the first-chamber-associated valve device locks up the working fluid in one of the respective first fluid chambers of the front-wheel-associated and rear-wheel-associated cylinder devices that is connected to the first-chamber-associated valve device, directly, i.e., without via the connection point where the first-chamber-associated passage is connected to the at least one fluid accommodating device, that is, the first fluid chamber of the first cylinder device, then some increase of the volume of the working fluid in the first fluid chamber of the first cylinder device results in some displacement of the corresponding wheel or wheels or some inclination of the vehicle body.

In addition, in the suspension system according to any of the modes (1) to (3), if the second-chamber-associated valve device locks up the working fluid in one of the respective second fluid chambers of the front-wheel-associated and rear-wheel-associated cylinder devices that is connected to the second-chamber-associated valve device, directly, i.e., without via the connection point where the second-chamber-associated passage is connected to the fluid accommodating device, that is, the second fluid chamber of the second cylinder device, then some increase of the volume of the working fluid in the second fluid chamber of the second cylinder device results in some displacement of the corresponding wheel or wheels or some inclination of the vehicle body.

In contrast, the suspension system according to this mode (4) employs the first-chamber-associated bypass passage which communicates the respective first fluid chambers of the front-wheel-associated and rear-wheel-associated cylinder devices, with each other, while substantially bypassing the first-chamber-associated valve device; and the second-chamber-associated bypass passage which communicates the respective second fluid chambers of the front-wheel-associated and rear-wheel-associated cylinder devices, with each other, while substantially bypassing the second-chamber-associated valve device.

Therefore, in the present suspension system, although the first-chamber-associated and second-chamber-associated valve devices are provided between the front-wheel-associated and rear-wheel-associated cylinder devices, the working fluid can flow between the two cylinder devices.

Thus, the present suspension system can prevent the vehicle body from being accidentally inclined so largely.

In this connection, it is noted that the technical feature according to this mode (4) can be embodied independent of the technical feature according to the mode (1).

(5) The system according to the mode (4), further comprising:

a first flow restrictor which is provided in the first-chamber-associated bypass passage and restricts a flow of the working fluid in the first-chamber-associated bypass passage; and a second flow restrictor which is provided in the second-chamber-associated bypass passage and restricts a flow of the working fluid in the second-chamber-associated bypass passage.

In the suspension system according to the above-described mode (4), the first-chamber-associated and second-chamber-associated bypass passages are provided between the front-wheel-associated and rear-wheel-associated cylinder devices, so that the two bypass passages may so operate as to disable the respective functions of the first-chamber-associated and second-chamber-associated valve devices.

In contrast, the suspension system according to this mode (5) employs the first flow restrictor which is provided in the first-chamber-associated bypass passage and restricts the flow of the working fluid in the first-chamber-associated bypass passage; and the second flow restrictor which is provided in the second-chamber-associated bypass passage and restricts the flow of the working fluid in the second-chamber-associated bypass passage. The flow resistance of each flow restrictor increases as the velocity at which the working fluid flows between the two cylinder devices increases.

Therefore, in the present suspension system, depending upon the velocity at which the working fluid flows between the front-wheel-associated and rear-wheel-associated cylinder devices, one, or both, of the first and second flow restrictors disables, or disable, the function, or the respective functions, of a corresponding one, or both, of the first-chamber-associated and second-chamber-associated bypass passages, and thereby enables, or enable, again the function, or the respective functions, of a corresponding one, or both, of the two cylinder devices.

(6) The system according to any of the modes (1) to (5), wherein said at least one fluid accommodating device comprises:

at least one accumulator which can accommodate the amount of the working fluid present in the first-chamber-associated and second-chamber-associated passages and the front-wheel-associated and rear-wheel-associated cylinder devices; and at least one accumulator-associated valve which is selectively placed in a communication position to communicate said at least one accumulator with the first-chamber-associated and second-chamber-associated passages, and in a shut-off position to shut off the communication between said at least one accumulator and the first-chamber-associated and second-chamber-associated passages.

Regarding a pressure circuit in which the front-wheel-associated and rear-wheel-associated cylinder devices are connected to each other via the first-chamber-associated and second-chamber-associated passages and those two cylinder devices and those two passages are filled with the working fluid, it is desirable not to connect the pressure circuit to any additional elastic, pressure-applying elements.

However, the working fluid filling the pressure circuit may thermally expand. Hence, in the case where it is allowable to connect the pressure circuit to one or more additional pressure-applying elements, it is desirable to connect the pressure circuit to one or more elements which can accommodate an amount of the working fluid that is increased by its thermal expansion, and thereby compensate for the thermal expansion of the working fluid.

Based on the above-explained knowledge, the suspension system according to this mode (6) employs the at least one fluid accommodating device which includes at least one accumulator which can accommodate an amount of the working fluid, and at least one accumulator-associated valve which is selectively placed in a communication position to communicate the at least one accumulator with at least one of the first-chamber-associated and second-chamber-associated passages, and in a shut-off position to shut off the communication.

The above-indicated accumulator-associated valve may be constructed to include either a movable element or a stationary element. One or more solenoid valves is or are one example of the former construction, and one or more mechanical valves is or are another example of the former construction; and one or more flow restrictors is or are one example of the latter construction.

(7) The system according to the mode (6), further comprising at least one relief passage which relieves the amount of the working fluid from the first-chamber-associated and second-chamber-associated passages into said at least one accumulator, while substantially bypassing said at least one accumulator-associated valve.

In a failure mode in which the accumulator-associated valve contains or locks up the working fluid in the pressure circuit in which the front-wheel-associated and rear-wheel-associated cylinder devices are connected to each other via the first-chamber-associated and second-chamber-associated passages, if the working fluid in either one of the two cylinder devices thermal expands, the each cylinder device may be subjected to a greater load than a nominal load.

However, the suspension system according to this mode (7) employs the at least one relief passage which relieves an amount of the working fluid from the first-chamber-associated and second-chamber-associated passages into the at least one accumulator, while substantially bypassing the at least one accumulator-associated valve.

Therefore, in the present suspension system, even if the accumulator-associated valve may be in disorder, the accumulator can accommodate the increased amount of the working fluid.

In this connection, it is noted that the technical feature according to this mode (7) can be embodied independent of the technical feature according to the mode (1).

(8) The system according to the mode (7), further comprising at least one relief valve which is provided in said at least one relief passage and which is opened when a pressure of the working fluid present in the first-chamber-associated and second-chamber-associated passages exceeds a reference value, so that the amount of the working fluid flows from the first-chamber-associated and second-chamber-associated passages into said at least one accumulator, while substantially bypassing said at least one accumulator-associated valve.

In the suspension system according to the above-described mode (7), the relief passage is provided between the accumulator and the first-chamber-associated and second-chamber-associated passages, so that the relief passage may disable the function of the accumulator-associated valve.

In contrast, the suspension system according to this mode (8) employs the at least one relief valve which is provided in the at least one relief passage and which is opened when a pressure of the working fluid present in the first-chamber-associated and second-chamber-associated passages exceeds a reference value.

Therefore, in the present suspension system, the function of the relief passage is selectively disabled, depending upon the pressure of the working fluid in the first-chamber-associated and second-chamber-associated passages, so that the proper function of the accumulator-associated valve may be restored.

(9) The system according to any of the modes (6) to (8), wherein said at least one accumulator-associated valve is normally placed in the communication position.

In the suspension system according to this mode (9), the accumulator-associated valve is normally placed in the communication position to communicate the first-chamber-associated and second-chamber-associated passages with the accumulator. Thus, when the present suspension system is not in use, the working fluid can flow between the two passages and the accumulator. Therefore, if the volume of the working fluid in each of the front-wheel-associated and rear-wheel-associated cylinder devices changes when the suspension system is not in use, an amount of the working fluid can flow into, or out of, the each cylinder device so as to compensate of the change of the volume of the working fluid.

(10) The system according to any of the modes (6) to (9), comprising two said accumulator-associated valves which are associated with the first-chamber-associated and second-chamber-associated passages, respectively.

(11) The system according to the mode (10), comprising two said accumulators (200) which are associated with the first-chamber-associated and second-chamber-associated passages, respectively.

(12) The system according to any of the modes (6) to (9), wherein said one accumulator-associated valve is commonly associated with the first-chamber-associated and second-chamber-associated passages.

(13) The system according to the mode (12), wherein said one accumulator is commonly associated with the first-chamber-associated and second-chamber-associated passages.

(14) The system according to any of the modes (1) to (13), wherein the first-chamber-associated valve device comprises a first-chamber-associated mechanical valve which is mechanically switched between a communication position to communicate the respective first fluid chambers of the front-wheel-associated and rear-wheel-associated cylinder devices, with each other, and a shut-off position to shut off the communication between said respective first fluid chambers, with a first cylinder pressure based on respective pressures of the respective working fluids in said respective first chambers, and the second-chamber-associated valve device comprises a second-chamber-associated mechanical valve which is mechanically switched between a communication position to communicate the respective second fluid chambers of the front-wheel-associated and rear-wheel-associated cylinder devices, with each other, and a shut-off position to shut off the communication between said respective second fluid chambers, with a second cylinder pressure based on respective pressures of the respective working fluids in said respective second chambers.

In the suspension system according to any of the above-described modes (1) to (13), each of the first-chamber-associated and second-chamber-associated valve devices may comprise one or more solenoid valves.

In contrast, in the suspension system according to this mode (14), each of the first-chamber-associated and second-chamber-associated valve devices comprises the mechanical valve which is mechanically switched between the communication position to communicate the respective first or second fluid chambers of the front-wheel-associated and rear-wheel-associated cylinder devices, with each other, and the shut-off position to shut off the communication, with the cylinder pressure based on the respective pressures of the respective working fluids in the respective first or second chambers.

(15) The system according to the mode (14), wherein each of the first-chamber-associated mechanical valve and the second-chamber-associated mechanical valve is normally placed in the communication position thereof and, when a corresponding one of the first and second cylinder pressures exceeds a reference value, the each mechanical is switched from the communication position to the shut-off position.

The more strongly the vehicle turns, the great centrifugal force and, eventually, the greater rolling moment the body of the vehicle is subjected to. The rolling moment causes the respective fluid pressures in the first or second fluid chambers to increase, such that the greater the rolling moment is, the higher the fluid pressures are. Meanwhile, the greater the rolling moment is, the greater the need to increase the rolling rigidity of the body is.

Based on the above-explained knowledge, the present suspension system is operated such that each of the two mechanical valves is normally placed in the communication position and, when the corresponding cylinder pressures exceed the reference value, the each mechanical is switched from the communication position to the shut-off position.

Therefore, in the present suspension system, each of the two mechanical valves is selectively switched to the communication position and the shut-off position, depending upon the corresponding cylinder pressure.

(16) The system according to the mode (15), wherein said each of the first-chamber-associated mechanical valve and the second-chamber-associated mechanical valve comprises:
 a housing;
 a valve portion including a valve member and a valve seat which comprise a first movable member;
 a second movable member which is movable with the first movable member and which is fitted in the housing to divide an inner room of the housing into a first room on the side of the valve portion and a second room opposite to the first room; and
 a biasing device which biases the second movable member in a direction in which the valve member is moved away from the valve seat.

(17) The system according to the mode (16), wherein the working fluid comprises a working liquid,
 wherein said at least one fluid accommodating device can accommodate an amount of the working liquid, and
 wherein the second room of said each mechanical valve is connected to said at least one fluid accommodating device.

In the suspension system according to the above-described mode (16), if the working fluid comprises a working liquid and the fluid accommodating device can accommodate an amount of the working liquid, the working liquid may leak, in the housing of each mechanical valve, from the first room (i.e., liquid chamber) on the side of the valve portion into the second room opposite to the first room, via a clearance provided between the housing and the second movable member fitted in the housing.

In contrast, in the suspension system according to this mode (17), the second room of each mechanical valve is connected to the fluid accommodating device.

Therefore, in the present suspension system, the fluid accommodating device can capture an amount of the working fluid that unexpectedly leaks from each mechanical valve.

(18) A suspension system for use in a vehicle including a body, left and right front wheels, and left and right rear wheels, the system comprising:
 a front-wheel-associated cylinder device which controls a relative displacement between the left and right front wheels in upward and downward directions, and which includes a housing and a piston fitted in the housing to divide an inner room of the housing into a first fluid chamber and a second fluid chamber;
 a rear-wheel-associated cylinder device which controls a relative displacement between the left and right rear wheels in the upward and downward directions, and which includes a housing and a piston fitted in the housing to divide an inner room of the housing into a first fluid chamber and a second fluid chamber which correspond to the first and second fluid chambers of the front-wheel-associated cylinder device, respectively;
 a first-chamber-associated passage which connects between the respective first fluid chambers of the front-wheel-associated and rear-wheel-associated cylinder devices;
 a second-chamber-associated passage which connects between the respective second fluid chambers of the front-wheel-associated and rear-wheel-associated cylinder devices;
 at least one fluid accommodating device which is connected to the first-chamber-associated passage at a first connection point, and is connected to the second-chamber-associated passage at a second connection point, and which can accommodate an amount of a working fluid present in the front-wheel-associated and rear-wheel-associated cylinder devices, the first-chamber-associated passage including two portions on opposite sides of the first connection point, respectively, the second-chamber-associated passage including two portions on opposite sides of the second connection point, respectively;
 a first-chamber-associated valve device which is selectively placed in a communication position to communicate the respective first fluid chambers of the front-wheel-associated and rear-wheel-associated cylinder devices, with each other, and a shut-off position to shut off the communication between said respective first fluid chambers;
 a second-chamber-associated valve device which is selectively placed in a communication position to communicate the respective second fluid chambers of the front-wheel-associated and rear-wheel-associated cylinder devices, with each other, and a shut-off position to shut off the communication between said respective second fluid chambers;
 the first-chamber-associated valve device comprising a first-chamber-associated mechanical valve which is mechanically switched between a communication position to communicate the respective first fluid chambers of the front-wheel-associated and rear-wheel-associated cylinder devices, with each other, and a shut-off position to shut off the communication between said respective first fluid chambers, with a first cylinder pressure based on respective pressures of respective working fluids in said respective first chambers; and the second-chamber-associated valve device comprising a second-chamber-associated mechanical valve which is mechanically switched between a communication position to communicate the respective second fluid chambers of the front-wheel-associated and rear-wheel-associated cylinder devices, with each other, and a shut-off position to shut off the communication between said respective second fluid chambers, with a second cylinder pressure based on respective pressures of respective working fluids in said respective second chambers.

Like the suspension system according to the above-described mode (14), the suspension system according to this mode (18) employs the first-chamber-associated and second-chamber-associated valve devices each of which comprises the mechanical valve which is mechanically switched between the communication position to communicate the respective first or fluid chambers of the front-wheel-associated and rear-wheel-associated cylinder devices, with each other, and the shut-off position to shut off the communication, with the cylinder pressure based on the respective pressures of the respective working fluids in the two first or second chambers.

(19) The system according to the mode (18), wherein each of the first-chamber-associated mechanical valve and the second-chamber-associated mechanical valve is normally placed in the communication position thereof and, when a corresponding one of the first and second cylinder pressures exceeds a reference value, the each mechanical valve is switched from the communication position to the shut-off position.

Like the suspension system according to the above-described mode (15), the suspension system according to this mode (19) employs the two mechanical valves each of which is selectively switched to the communication position and the shut-off position, depending upon the corresponding cylinder pressure.

(20) The system according to the mode (19), wherein said each of the first-chamber-associated mechanical valve and the second-chamber-associated mechanical valve comprises:

a housing;

a valve portion including a valve member and a valve seat which comprise a first movable member;

a second movable member which is movable with the first movable member and which is fitted in the housing to divide an inner room of the housing into a first room on the side of the valve portion and a second room opposite to the first room; and a biasing device which biases the second movable member in a direction in which the valve member is moved away from the valve seat.

BEST MODE FOR CARRYING OUT THE INVENTION

Hereinafter, there will be described in detail, by reference to the drawings, some embodiments of the present invention.

Figure 1:
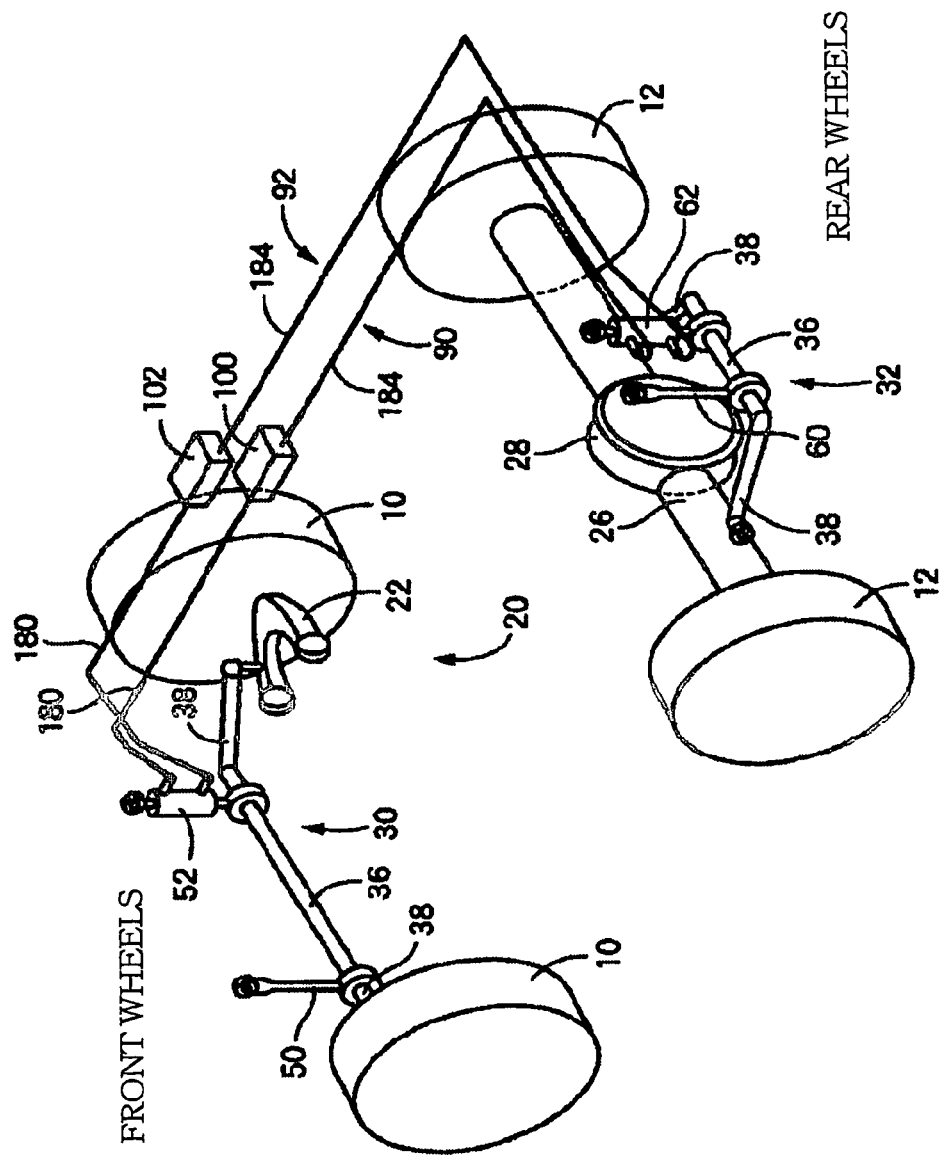
FIG. 1 is a perspective view of a suspension system as a first embodiment of the present invention.

FIG. 1 shows a suspension system 20 as a first embodiment of the present invention in a state in which the suspension system 20 is in use in a vehicle in which left and right front wheels 10, 10 and left and right rear wheels 12, 12 are supported by a body, not shown, and the suspension system 20 is provided between the wheels 10, 12 and the vehicle body.

The vehicle body is connected via the suspension system 20 to the left and right front wheels 10, 10 and the left and right rear wheels 12, 12, such that the body is displaceable relative to each of the wheels 10, 12. The suspension system 20 supports the left and right front wheels 10, 10 via left and right lower arms 22, 22, respectively, such that each of the front wheels 10 is rockable relative to the body. In addition, the suspension system 20 supports the left and right rear wheels 12, 12, via a rear axle housing 26, such that each of the rear wheels 12 is rockable relative to the body. The rear axle housing 26 holds a rear axle, not shown, such that the rear axle is rotatable together, and coaxially, with the rear wheels 12, 12. The rear axle distributes, as well known in the art, the drive torque of a drive shaft, not shown, to the two rear wheels 12, 12 via a differential device 28.

The suspension system 20 includes a front stabilizer bar 30 and a rear stabilizer bar 32. Each of the two stabilizer bars 30, 32 extends in a widthwise direction of the vehicle body, and connects between the corresponding left and right wheels 10, 12, as well known in the art. Each stabilizer bar 30, 32 includes a rod-like torsion portion 36 which extends in the widthwise direction of the body; and two arm portions 38, 38 which extend from opposite ends of the torsion portion 36, such that the two arm portions 38 are bent in a common plane. More specifically described, the two bent arm portions 38 of the front stabilizer bar 30 extend toward the rear stabilizer bar 32; and the two bent arm portions 38 of the rear stabilizer bar 32 extend toward the front stabilizer bar 30.

Respective end portions of the two arm portions 38, 38 of the front stabilizer bar 30 are pivotally connected to respective portions of the two lower arms 22, 22 that are outward offset from the respective centers of rocking thereof, as seen in the widthwise direction of the vehicle body. On the other hand, respective end portions of the two arm portions 38, 38 of the rear stabilizer bar 32 are pivotally connected to the rear axle housing 26.

When the left and right front wheels 10, 10 tend to move in opposite phases, respectively, the front stabilizer bar 30 operates to increase a rolling rigidity of the vehicle body. Likewise, when the left and right rear wheels 12, 12 tend to move in opposite phases, respectively, the rear stabilizer bar 32 operates to increase the rolling rigidity of the body.

In a conventional suspension system, front and rear stabilizer bars control the rolling rigidity of a vehicle body, independent of each other. In contrast thereto, in the present suspension system 20, the front and rear stabilizer bars 30, 32 are mechanically associated with each other, as will be described in detail below.

In the present suspension system 20, the front stabilizer bar 30 is connected to the vehicle body, via two portions of the torsion portion 36 that are distant from a longitudinal or lengthwise centerline of the body in widthwise opposite directions thereof, respectively. More specifically described, one of those two portions of the torsion portion 36 is connected to the body via a connection rod 50 whose length is unchangeable; and the other portion is connected to the body via a cylinder device 52 whose length is changeable. The connection rod 50 and the cylinder device 52 extend in a generally vertical direction.

Like the front stabilizer bar 30, the rear stabilizer bar 32 is connected to the vehicle body, via two portions of the torsion portion 36 that are distant from the lengthwise centerline of the body in the widthwise opposite directions thereof, respectively. One of those two portions of the torsion portion 36 is connected to the body via a connection rod 60 whose length is unchangeable; and the other portion is connected to the body via a cylinder device 62 whose length is changeable. The connection rod 60 and the cylinder device 62 extend in a generally vertical direction.

In the present embodiment, the cylinder device 52 provides a front cylinder device; and the cylinder device 62 provides a rear cylinder device.

In the present embodiment, each of the two cylinders 52, 62 connects a corresponding one of the two stabilizer bars 30, 32 to the vehicle body, such that the one stabilizer bar 30, 32 is displaceable relative to the body. However, the present invention may otherwise be embodied such that each stabilizer bar 30, 32 is divided into left and right portions, and each cylinder device 52, 62 is used to connect between the two portions such that the two portions are displaceable relative to each other. That is, according to the present invention, each of the cylinder devices 52, 62 is just required to allow the relative displacement of the corresponding left and right wheels 10, 12 in the generally vertical direction.

In addition, according to the present invention, each cylinder device 52, 62 is not essentially required to connect the corresponding wheels 10, 12 to the body via the corresponding stabilizer bar 30, 32. For example, the present invention may be embodied such that each of the front and rear wheels 10, 12 is associated with a cylinder device which connects the each wheel to the body via a member which is movable with the each wheel.

Figure 2:
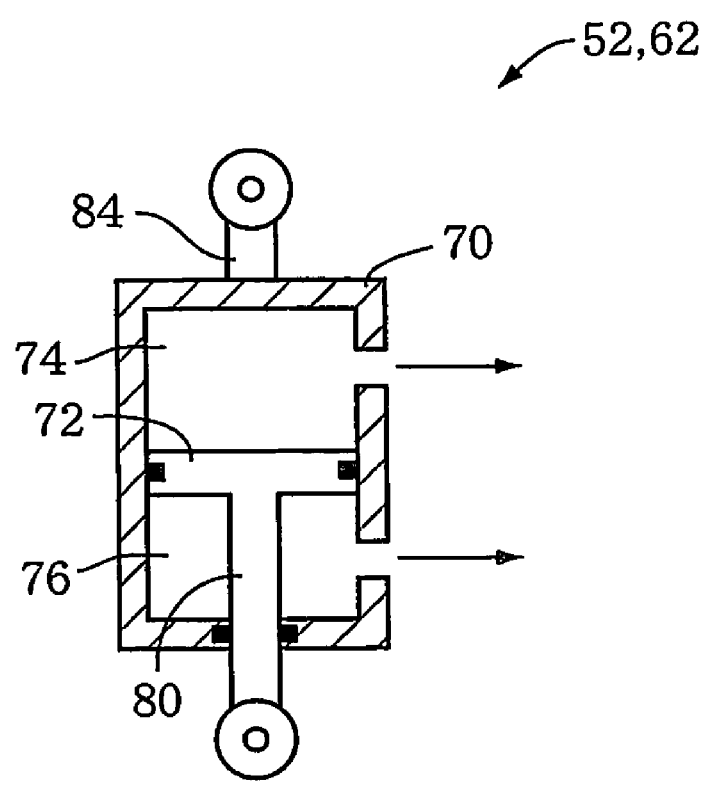
FIG. 2 is a cross-sectioned, front elevation view of a cylinder device of the system of FIG. 1.

The front and rear cylinder devices 52, 62 have an identical construction. FIG. 2 is a cross-sectional, front elevation view of each cylinder device 52, 62. Each cylinder device 52, 62 includes a hollow housing 70 whose opposite ends are closed; and a piston 72 which is substantially liquid-tightly and slideably fitted in the housing 70. This fitting divides an inner space of the housing 70 into two chambers 74, 76. In the present embodiment, each cylinder device 52, 62 is mounted on the vehicle such that the each cylinder device 52, 62 extends in the generally vertical direction. Hence, hereinafter, an upper one 74 of the two chambers 74, 76 will be referred to as the upper chamber 74; and the lower one will be referred to as the lower chamber 76.

As shown in FIG. 2, a piston rod 80 extends from one side of the piston 72, coaxially with the same 72, and projects through the wall of the housing 70 into the atmosphere. In the present embodiment, the piston rod 80 extends downward from the lower surface of the piston 72 that faces the lower chamber 76. As shown in FIG. 1, an end portion of the piston rod 80 is pivotally connected to the corresponding stabilizer bar 30, 32. As shown in FIG. 2, a fixed rod 84 extends, coaxially with the piston rod 80, from one of the opposite ends of the housing 70 that is opposite to the other end thereof through which the piston rod 80 projects into the atmosphere. In the present embodiment, an end of the fixed rod 84 is pivotally connected to the vehicle body, not shown (cf. FIG. 1).

As is apparent from the foregoing description, each of the two stabilizer bars 30, 32 is connected, as shown in FIG. 1, to the vehicle body, at one side portion of the each bar via a corresponding one of the cylinder devices 52, 62 and, at the other side portion of the each bar via a corresponding one of the connection rods 50, 60. The front and rear cylinder devices 52, 62 are provided corresponding to a same side portion of the vehicle body, i.e., a right-hand side portion of the body as seen in FIG. 1.

Therefore, in the present embodiment, when the right-hand side portion of the vehicle body tends to roll downward, both the respective pistons 72 of the front and rear cylinder devices 52, 62 move upward in the respective housings 70, i.e., the respective piston rods 80 are retracted into the respective housings 70, so that respective pressures in the respective upper chambers 74 of the cylinder devices 52, 62 increase.

In the present embodiment, the respective upper chambers 74 of the front and rear cylinder devices 52, 62 provide respective first chambers thereof, and the respective lower chambers 76 of the two cylinder devices 52, 62 provide respective second chambers thereof.

As shown in FIG. 1, the respective upper chambers 74 of the front and rear cylinder devices 52, 62 are connected to each other via a first passage 90; and, likewise, the respective lower chambers 76 of the two cylinder devices 52, 62 are connected to each other via a second passage 92. Thus, in the present embodiment, the first passage 90 provides a first-chamber passage; and the second passage 92 provides a second-chamber passage.

As shown in FIG. 1, a first liquid pressure unit 100 is connected to an intermediate portion of the first passage 90; and a second liquid pressure unit 102 is connected to an intermediate portion of the second passage 92.

Figure 3:
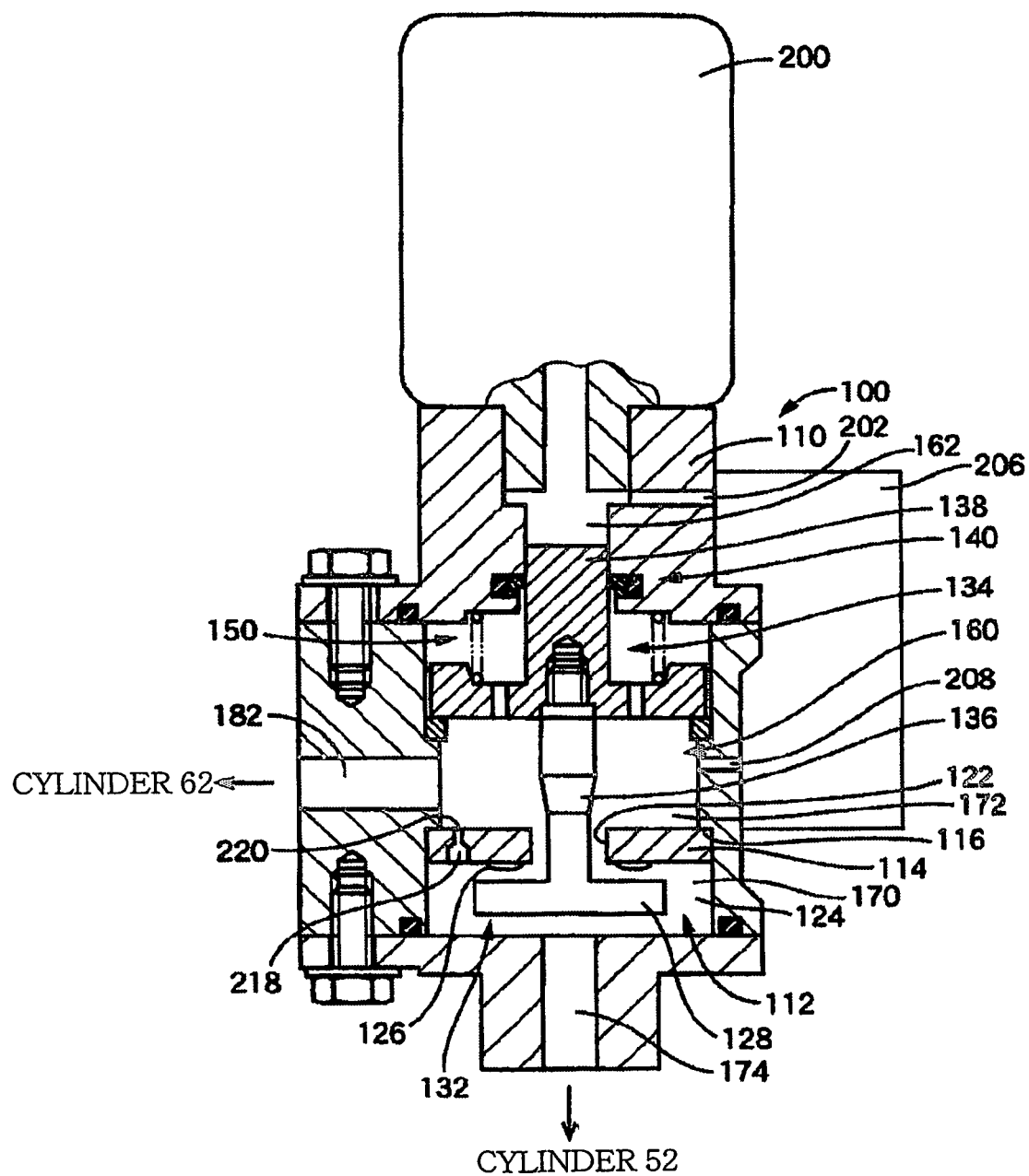
FIG. 3 is a partly cross-sectioned, front elevation view of a mechanical valve, a solenoid valve, and an accumulator of the system of FIG. 1.

FIG. 3 is a cross-sectional, front elevation view of the first liquid pressure unit 100. The pressure unit 100 includes a housing 110 having a stepped valve hole 112. A valve-seat defining member 114 which defines a valve seat 126, described later, is substantially liquid-tightly fitted, and fixed, in the valve hole 112. A position of the valve seat defining member 114 in an axial direction of the pressure unit 100 is defined by a shoulder surface 116 of the stepped valve hole 112.

The valve seat defining member 114 has a through-hole 122 that is coaxial with the member 114 itself, and defines the valve seat 126 around the through-hole 122, such that the valve seat 126 faces a vacant space 124 communicating with the through-hole 122. A valve member 128 is provided in the vacant space 124, and has such a shape which assures that the valve member 128 can be seated on the valve seat 126. Thus, in the present embodiment, the valve seat 126 and the valve member 128 cooperate with each other to provide a valve portion 132.

In addition, a plunger 134 is slideably fitted in the valve hole 112, such that the plunger 134 is coaxially opposed to the valve portion 132. One end portion of the plunger 134 provides a valve opening portion 136; and the other end portion of the same 134 provides a fitting portion 138.

The valve opening portion 136 of the plunger 134 projects through the through-hole 122, and reaches the valve member 128. In the present embodiment, the valve opening portion 136 and the valve member 128 are formed integrally with each other. When the valve opening portion 136 is operated, that portion 136 separates the valve member 128 from the valve seat 126. The fitting portion of the plunger 134 is slideably fitted in the valve hole 112. A bi-directional seal member 140, fixed in the valve hole 112, assures that the fitting portion 138 is liquid-tightly fitted in the valve hole 112.

A coil spring 150 as a biasing member or device is provided between the plunger 134 and the housing 110. More specifically described, a portion of the coil spring 150 is inserted in a shallow hole of the plunger 134, such that the coil spring 150 is coaxial with the plunger 134. One end of the coil spring 150 rests on the housing 110, and the other end of the same 150 rests on the plunger 134. The coil spring 150 always biases the plunger 134 in a direction to separate the valve member 128 from the valve seat 126.

The plunger 134 whose fitting portion 138 is fitted in the valve hole 112 divides the inner space of the valve hole 112 into a first liquid chamber 160 located on the side of the valve portion 132, and a second liquid chamber 162 on the opposite side.

The valve seat 126 divides the first liquid chamber 160 into a third liquid chamber 170 located on the valve member 128, and a fourth liquid chamber 172 on the opposite side. The third liquid chamber 170 is connected to the upper chamber 174 of the front cylinder device 52 via a passage 174 formed in the housing 110 and then a front-wheel-side portion 180 of the first passage 90, shown in FIG. 1, in the order of description. On the other hand, the fourth liquid chamber 172 is connected to the upper chamber 174 of the rear cylinder device 62 via a passage 182 formed in the housing 110 and then a rear-wheel-side portion 184 of the first passage 90 in the order of description.

In the present embodiment, normally, the plunger 134 separates the valve member 128 from the valve seat 126, so that the third and fourth liquid chambers 170, 172 communicate with each other. In this state, if the pressure in the third and fourth liquid chambers 170, 172 increases and eventually exceeds a valve opening pressure corresponding to the operating force of the plunger 134, the plunger 134 is retracted and the valve member 128 is seated on the valve seat 126.

In this state, if the pressure in the third liquid chamber 170 is higher than that in the fourth liquid chamber 172, the valve member 128 is kept seated on the valve seat 126, so that the flow of working liquid from the upper chamber 74 of the front cylinder device 52 to the upper chamber 74 of the rear cylinder device 62 is stopped.

In this state, if the pressure in the fourth liquid chamber 172 lowers to below the valve opening pressure, the plunger 134 is restored to its initial position, so that the valve member 128 is moved away from the valve seat 126. Thus, the third and fourth liquid chambers 170, 172 are restored to their initial state in which the two chambers 170, 172 communicate with each other, and accordingly the flow of working liquid between the respective upper chambers 74 of the front and rear cylinder devices 52, 62 is allowed.

As is apparent from the foregoing description of the present embodiment, the housing 110, the valve portion 132 including the valve seat 126 and the valve seat 128, and the spring 150 cooperate with each other to provide a mechanical valve 190 as a first-chamber valve device.

Figure 4:
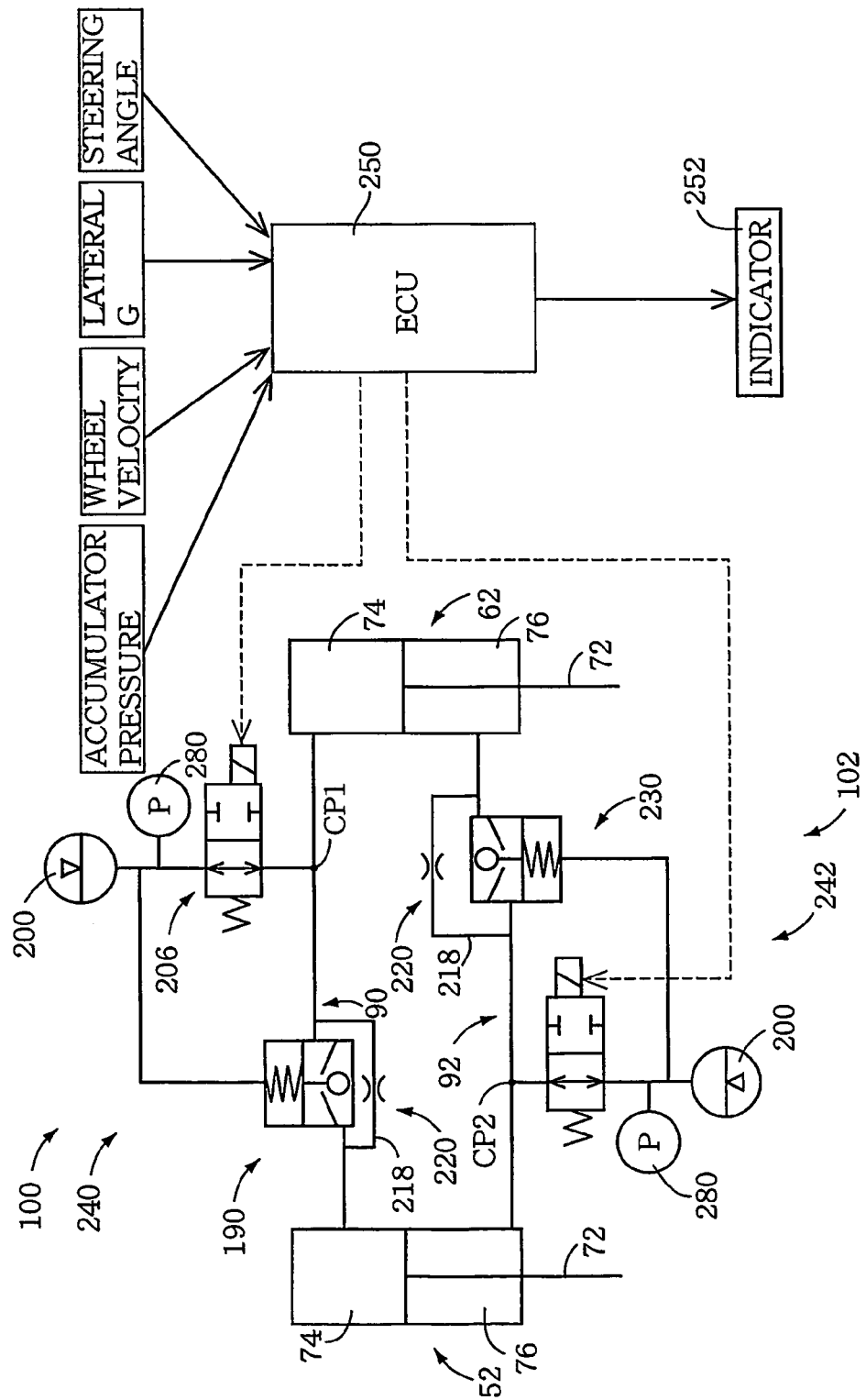
FIG. 4 is a diagrammatic view for explaining conceptually a hardware construction of the system of FIG. 1, including two pressure circuits of the system.

As shown in FIG. 4, an accumulator 200 is connected to a connection point, CP1, of the first passage 90, and the mechanical valve 190 is provided in a portion of the first passage 90 that is located between the connection point CP1 and the front cylinder device 52.

As shown in FIG. 3, the housing 110 supports the accumulator 200. As well known in the art, the accumulator 200 includes a housing having a bottom wall, and a piston substantially liquid-tightly and slideably fitted in the housing, although not shown. The accumulator 200 has, in rear of the piston, a high pressure chamber filled with nitrogen gas as compressed gas and, in front of the piston, a storage chamber which can store the working liquid under pressure.

An inlet of the accumulator 200 is connected to the fourth liquid chamber 172 via a passage 202 formed in the housing 110, a solenoid valve 206, and another passage 208 formed in the housing 110, in the order of description.

As well known in the art, the solenoid valve 206 includes a solenoid which generates a magnetic force upon application thereto of an electric current, and a valve portion which is selectively operated by the magnetic force to an opening position where the valve portion opens an internal passage and a closing position where the valve portion closes the internal passage, although not shown. In the present embodiment, the solenoid valve 206 is of a normally open type, that is, while the electric current is not applied to the valve 206, the valve 206 takes a communication position (i.e., the opening position) where the valve 206 communicates the fourth liquid chamber 172 and the accumulator 200 with each other and, while the electric current is applied to the valve 206, the valve 206 takes a shut-off position (i.e., the closing position) where the valve 206 disconnects the fourth liquid chamber 172 and the accumulator 200 from each other.

In the state in which the solenoid valve 206 is held at the opening position, if the working liquid present in each of the cylinder devices 52, 62 thermally expands and the volume of the liquid increases by a certain amount, then that amount of liquid is returned to the accumulator 200. Thus, the volume of the working liquid in each cylinder device 52, 62 is compensated for the increase of temperature of the liquid.

In addition, in the above-indicated state, if the volume of the working liquid in each cylinder device 52, 62 decreases by a certain amount, then that amount of liquid is replenished from the accumulator 200. Thus, the volume of the working liquid in each cylinder device 52, 62 is also compensated.

Thus, in the present embodiment, the solenoid valve 206 provides an accumulator-associated valve which cooperates with the accumulator 200 to provide a working fluid storing device.

The second liquid chamber 162 is always in communication with the inlet of the accumulator 200. Therefore, the plunger 134 receives the pressure applied by the accumulator 200, in the direction to separate the valve member 128 from the valve seat 126. Thus, the plunger 134 receives, as a force to separate the valve member 128 from the valve seat 126, the sum of the elastic force of the coil spring 150 and the liquid pressure applied by the accumulator 200.

Therefore, in the mechanical valve 190, the plunger 134 is not retracted from its initial position before the pressure in the fourth liquid chamber 172 exceeds the valve opening pressure corresponding to the sum of the elastic force of the spring 150 and the liquid pressure of the accumulator 200. This retraction of the plunger 134 causes the valve member 128 to be seated on the valve seat 126, so that the third and fourth liquid chambers 170, 172 are disconnected from each other.

The mechanical valve 190 has, in a portion thereof that separates the third and fourth liquid chambers 170, 172 from each other, has a bypass passage 218 which bypasses the through-hole 122 and the valve seat 126, and an orifice 220 as a flow restrictor. In the present embodiment, the bypass passage 218 and the orifice 220 are formed in series through the thickness of the valve seat defining member 114, as shown in FIG. 3. Owing to the bypass passage 218 and the orifice 220, the third and fourth liquid chambers 170, 172 can communicate with each other, irrespective of whether the valve portion 132 may be open or closed.

The foregoing description relates to the construction of the upper-chamber-associated mechanical valve 190 that is associated with the first passage 90 connecting between the respective upper chambers 74, 74 of the front and rear cylinder devices 52, 62. A lower-chamber-associated mechanical valve 230 (FIG. 4) is associated with the second passage 92 connecting between the respective lower chambers 76, 76 of the front and rear cylinder devices 52, 62. Since the lower-chamber-associated mechanical valve 230 has a construction identical with that of the upper-chamber-associated mechanical valve 190, a redundant description of the mechanical valve 230 is omitted.

However, a first manner in which the first mechanical valve 190 is connected to the front and rear cylinder devices 52, 62 differs from a second manner in which the second mechanical valve 230 is connected to the two cylinder devices 52, 62. Hereinafter, the first and second connection manners will be described by reference to FIG. 4.

FIG. 4 conceptualizes hardware and software constructions of the suspension system 20 as the first embodiment of the present invention.

As is apparent from the present embodiment shown in FIG. 4, in the above-indicated first manner, the upper chamber 74 of the front cylinder device 52 is connected to the first mechanical valve 190, such that the first mechanical valve 190 is located between the upper chamber 74 of the front cylinder device 52 and the accumulator 200 of the first liquid pressure unit 100, whereas the upper chamber 74 of the rear cylinder device 62 is connected to the first mechanical valve 190, such that the first mechanical valve 190 is not located between the upper chamber 74 of the rear cylinder device 62 and the accumulator 200 of the first liquid pressure unit 100.

In the above-indicated second manner that is conceptually symmetric with the first manner, the lower chamber 76 of the front cylinder device 52 is connected to the second mechanical valve 230, such that the second mechanical valve 230 is not located between the lower chamber 76 of the front cylinder device 52 and the accumulator 200 of the second liquid pressure unit 102, whereas the lower chamber 76 of the rear cylinder device 62 is connected to the second mechanical valve 230, such that the second mechanical valve 230 is located between the lower chamber 76 of the rear cylinder device 62 and the accumulator 200 of the second liquid pressure unit 102. That is, as shown in FIG. 4, the accumulator 200 of the second liquid pressure unit 102 is connected to a connection point, CP2, of the second passage 92, and the second mechanical valve 230 is provided in a portion of the second passage 92 that is located between the second connection point CP2 and the rear cylinder device 62.

Thus, in the present embodiment, the mechanical valve 190, the first passage 90, and the accumulator 200 and the solenoid valve 206 of the first liquid pressure unit 100 cooperate with each other to provide an upper-chamber-associated pressure circuit 240; and the mechanical valve 230, the second passage 92, and the accumulator 200 and the solenoid valve 206 of the second liquid pressure unit 102 cooperate with each other to provide a lower-chamber-associated pressure circuit 242. FIG. 4 conceptually shows respective functions of the first and second pressure circuits 240, 242. As is apparent from FIG. 4, the two pressure circuits 240, 242 are designed to have a layout in which the two circuits 240, 242 are point-symmetric with each other.

Like the first liquid pressure unit 100 shown in FIG. 3, the second liquid pressure unit 102 includes the mechanical valve 230, the second passage 92, the accumulator 200, and the solenoid valve 206.

In the present embodiment, each of the front and rear cylinder devices 52, 62 is designed such that a volume-to-stroke conversion rate of the upper chamber 74 thereof is lower than that of the lower chamber 76 thereof. The volume-to-stroke conversion rate means a rate at which an amount of change of the volume of the upper or lower chamber 74, 76 of each cylinder device 52, 62 is converted into an amount of displacement (i.e., change of the position) of the piston 72 of the same 52, 62 that is caused by the change of the volume.

That is, in the present embodiment, the upper chamber 74 of the front cylinder device 52 that has the lower volume-to-stroke conversion rate is connected to the mechanical valve 190 such that the mechanical valve 190 is located between the upper chamber 74 of the front cylinder device 52 and the first accumulator 200; and the lower chamber 76 of the rear cylinder device 62 that has the higher volume-to-stroke conversion rate is connected to the mechanical valve 230 such that the mechanical valve 230 is located between the lower chamber 76 of the rear cylinder device 62 and the second accumulator 200, as shown in FIG. 4.

As shown in FIG. 4, the present suspension system 20 includes an electronic control unit 250 (hereinafter, referred to as the "ECU 250") which controls the two solenoid valves 206, 206. The ECU 250 obtains information related to the pressure of each of the two accumulators 200; information related to a velocity of each of the four wheels 10, 12, as information related to a state of the vehicle; information related to a widthwise-direction acceleration (i.e., a lateral gravity) of the vehicle body (indicated at "LATERAL G" in the figure); and information related to a steering angle, i.e., a rotation angle of a steering wheel of the vehicle that is manually controlled by a driver, controls each of the solenoid valves 206 based on the thus obtained various sorts of information, and controls an indicator 252 to display information useful to the driver.

Figure 5:
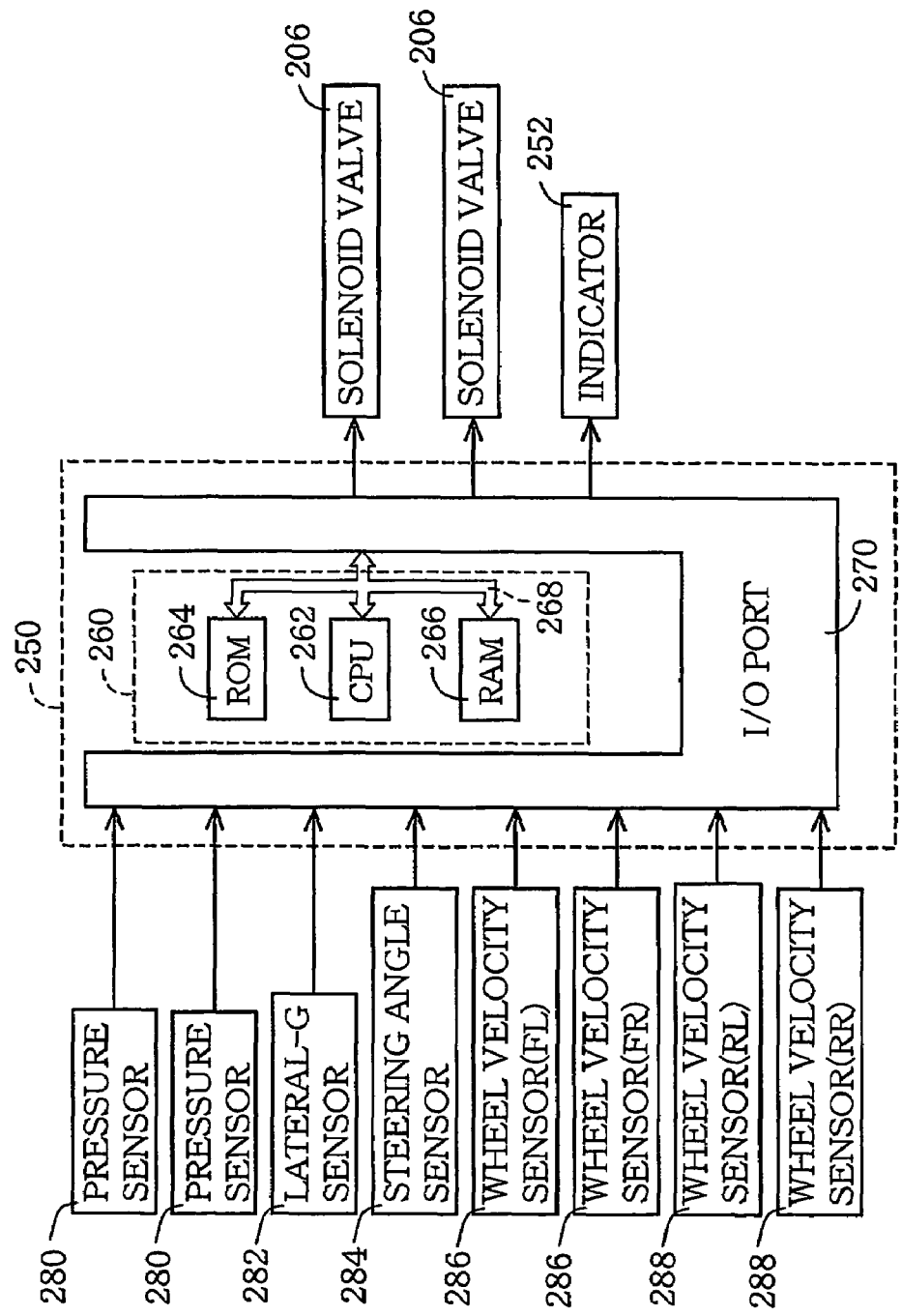
FIG. 5 is a diagrammatic view for explaining conceptually a software construction of the system.

FIG. 5 is a diagrammatic view for conceptually explaining the software construction of the suspension system 20. The ECU 250 is essentially provided by a computer 260 which is constituted, as well known in the art, by a CPU (central processing unit) 262, a ROM (read only memory) 264, a RAM (random access memory) 266, and a bus 268 which connects those elements 262, 264, 266 to each other. The computer 260 is connected via an I/O (input and output) port 270 to various external devices.

More specifically described, the ECU 250 is connected to two pressure sensors 280, 280 which detect respective pressure values of the two accumulators 200, 200. In addition, the ECU 250 is connected to a lateral-G sensor 282 which detects the lateral gravity of the vehicle body, and a steering angle sensor 284 which detects the steering angle. Those sensors 282, 284 can be used to judge whether the vehicle is turning, and/or recognize an amount of rolling motion of the vehicle body.

Moreover, the ECU 250 is connected to two wheel-velocity sensors (FL, FR) 286, 286 which detect respective velocities (i.e., respective angular velocities) of the left and right front wheels 10, 10, and two wheel-velocity sensors (RL, RR) 288, 288 which detect respective velocities (i.e., respective angular velocities) of the left and right rear wheels 12, 12. Those sensors 286, 288 are used to judge whether the vehicle is running, and/or whether the vehicle is turning.

Moreover, the ECU 250 is connected to the two solenoid valves 206, 206 and the indicator 252. The indicator 252 can be used to inform visibly the driver of the useful information. The indicator 252 is a sort of output device, and may be replaced with, or accompanied by, an alarm device (e.g., a buzzer or a pseudo-voice outputting device) which informs audibly the driver of the useful information.

Figure 6:
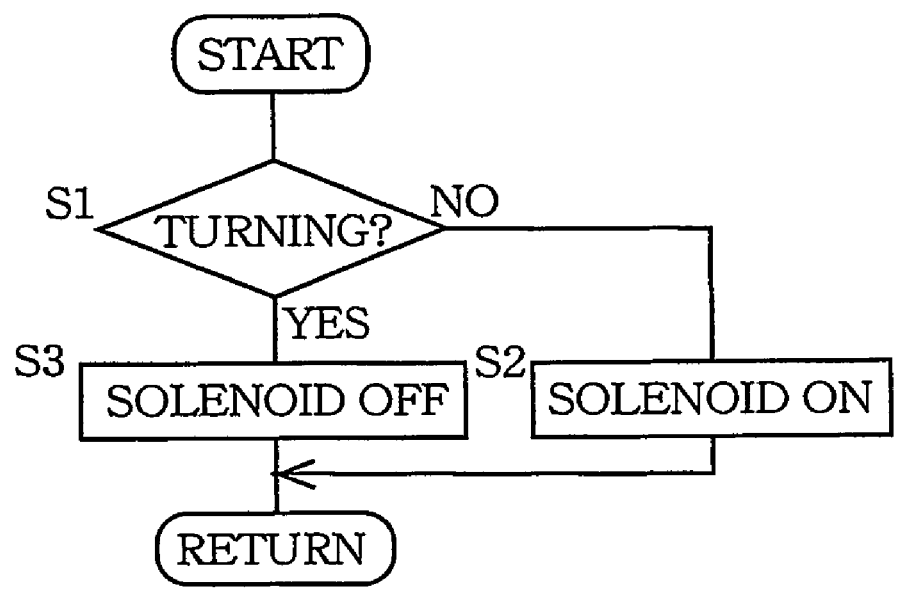
FIG. 6 is a flow chart for explaining conceptually a valve control program which is implemented by a computer shown in FIG. 5.

The ROM 264 stores various programs which are used by the computer 260 to operate the suspension system 20. One of those programs is a valve-control program which is used to control the solenoid valves 206 as the accumulator-associated valves, and is conceptually represented by a flow chart shown in FIG. 6.

This valve control program is iteratively implemented after an appropriate switch (e.g., an ignition switch) of the vehicle is turned ON by the driver. Each time the computer 260 implements this program, first at Step S1, the computer judges whether the vehicle is turning, based on the respective signals supplied from the lateral-G sensor 282, the steering angle sensor 284, and so on.

Providing that the vehicle is not turning, a negative judgment is made at Step S1, and the control of the computer proceeds with Step S2 where the computer operates for turning OFF the solenoid of each of the two solenoid valves 206.

Since both of the two solenoid valves 206 are of the normal open type, as described above, those valves 206 are each in the closed state, before the present program is implemented. That is, the front and rear cylinder devices 52, 62 are in communication with the corresponding accumulators 200. Therefore, if the volume of the working liquid present in each of the cylinder devices 52, 62 increases by a certain amount because of thermal expansion, that amount of working liquid is returned, under pressure, to a corresponding one of the accumulators 200 via a corresponding one of the solenoid valves 206.

Since the current control cycle is the first or initial one of a series of control cycles according to this program, the two solenoid valves 206 are each kept in the open position (i.e., the communication position), even if Step S2 may not be carried out.

Thus, one control cycle according to the valve control program is finished.

On the other hand, providing that the vehicle is turning, a positive judgment is made at Step S1, and the control goes to Step S3 to turn ON the solenoid of each of the front-side and rear-side solenoid valves 206. That is, the two solenoid valves 206 shut off the respective communications between the front and rear cylinder devices 52, 62 and the corresponding accumulators 200. Thus, the working liquid is contained in each of the pressure circuits 240, 242 which are provided by the first and second passages 90, 92, respectively, each of which connects between the front and rear cylinder devices 52, 62.

Thus, one control cycle according to the valve control program is finished.

In the state in which the front and rear cylinder devices 52, 62 are shut off from the corresponding accumulators 200 and the working liquid is contained in each of the pressure circuits 240, 242, if the vehicle body is rolling while turning, the respective pressures in the front and rear cylinder devices 52, 62 are equal to each other, and flowing of the working liquid between the two cylinder devices 52, 62 is inhibited. Consequently the respective pistons 72, 72 of the two cylinder devices 52, 62 are inhibited from moving in a same direction, e.g., a direction in which the wheels 10, 12 bounces. Therefore, like in a conventional vehicle which does not employ the front or rear cylinder device 52, 62, the two stabilizer bars 30, 32 can be twisted and accordingly can effectively exhibit their proper function, so that the rolling of the vehicle body is restrained.

On the other hand, if the vehicle is not turning and one of the same-side front and rear wheels 10, 12, i.e., one of the right-side front and rear wheels 10, 12 or the left-side front and rear wheels 10, 12 is bouncing, the respective pressures in the front and rear cylinder devices 52, 62 are not equal to each other, and flowing of the working liquid between the two cylinder devices 52, 62 is allowed. Consequently the respective pistons 72 of the two cylinder devices 52, 62 are allowed to move in opposite directions, respectively. That is, the piston 72 of one of the two cylinder devices 52, 62 is allowed to move in a direction in which the corresponding wheel bounces, and the piston 72 of the other cylinder device is allowed to move in a direction in which the corresponding wheel re-bounces. Therefore, unlike in the conventional vehicle which does not employ the front or rear cylinder device 52, 62, the two stabilizer bars 30, 32 can be restrained from being twisted and accordingly can be restrained from exhibiting their proper function, so that the properties of articulation of the suspension system 20 are improved.

In the present embodiment, as described above by reference to FIG. 4, the upper chamber 74 of the front cylinder device 52 that has the lower volume-to-stroke conversion rate than that of the lower chamber 76 thereof is connected to the mechanical valve 190 such that the mechanical valve 190 is located between the upper chamber 74 of the front cylinder device 52 and the first accumulator 200; and the lower chamber 35-76 of the rear cylinder device 62 that has the higher volume-to-stroke conversion rate than that of the upper chamber 74 thereof is connected to the mechanical valve 230 such that the mechanical valve 230 is located between the lower chamber 76 of the rear cylinder device 62 and the second accumulator 200.

Therefore, in a failure mode in which the mechanical valve 190 contains the working liquid in the upper chamber 74 of the front cylinder device 52, the thermal expansion of the working liquid results in extending the piston rod 80 of the cylinder device 52 from its nominal, neutral position. The working liquid that thermally expands includes, in addition to the liquid present in the cylinder device 52, the liquid present in a portion of the first passage 90 that is located between the cylinder device 52 and the mechanical valve 190.

However, if the first case where a certain amount of working liquid is charged into the upper chamber 74 is compared with the second case where the same amount of working liquid is charged into the lower chamber 76, an amount of displacement of the piston rod 80 caused by the charging of the fluid in the first case is smaller than that in the second case, because the upper chamber 74 has the lower volume-to-stroke conversion rate than that of the lower chamber 76.

Therefore, in the present embodiment in which the mechanical valve 190 is connected to the upper chamber 74 of the front cylinder device 52, an amount of deviation of the actual position of the piston rod 80 of the cylinder device 52 from its nominal neutral position, caused by the thermal expansion of the working liquid, is smaller than that in an arrangement in which the mechanical valve 190 is connected to the lower chamber 76 of the cylinder device 52.

On the other hand, in another failure mode in which the mechanical valve 230 contains the working liquid in the lower chamber 76 of the rear cylinder device 62, the thermal expansion of the working liquid results in retracting the piston rod 80 of the cylinder device 62 from its nominal, neutral position. The working liquid that thermally expands includes, in addition to the liquid present in the cylinder device 62, the liquid present in a portion of the second passage 92 that is located between the cylinder device 62 and the mechanical valve 230.

The above indicated, second failure mode differs from the previously indicated, first failure mode, in that the increased amount of working liquid in the second passage 92 is charged into the lower chamber 76 of the rear cylinder device 62 that has the higher volume-to-stroke conversion rate than that of the upper chamber 74. However, in the present vehicle, an engine unit, not shown, operating as not only a power source, but also a heat source, of the vehicle is located at a position nearer to the front cylinder device 52 than to the rear cylinder device 62. Therefore, the rear cylinder device 62 and a portion of the second passage 92 that is near to the same 62 are less influenced by the heat generated by the engine, than the front cylinder device 52 and a portion of the first passage 52 that is near to the same 52.

Therefore, although the mechanical valve 230 is connected to not the upper chamber 74, but the lower chamber 76, of the rear cylinder device 62, the amount of deviation of the piston rod 80 of the cylinder device 62 from its neutral position, caused by the containing of the working liquid, is, in fact, considerably small.

As is apparent from the foregoing description, in the first embodiment, the upper chamber 74 of the front cylinder device 52 that has the lower volume-to-stroke conversion rate than that of the lower chamber 76 is connected to the mechanical valve 190 such that the mechanical valve 190 is located between the upper chamber 74 of the front cylinder device 52 and the first accumulator 200, whereas not the upper chamber 74, but the lower chamber 76, of the rear cylinder device 62 that has the higher volume-to-stroke conversion rate than that of the upper chamber 74 thereof is connected to the mechanical valve 230 such that the mechanical valve 230 is located between the lower chamber 76 of the rear cylinder device 62 and the second accumulator 200. However, in the front-wheel-side portion of the vehicle where the working liquid is more likely to expand thermally, the upper chamber 74 of the front cylinder device 52 that has the lower volume-to-stroke conversion rate than that of the lower chamber 76 thereof is connected to the mechanical valve 190 such that the mechanical valve 190 is located between the upper chamber 74 of the front cylinder device 52 and the first accumulator 200. Therefore, even if both the two mechanical valves 190, 230 may be stuck at the respective positions where those valves 190, 230 contain the working liquid in the corresponding cylinder devices 52, 62, the respective deviations of the respective piston rods 80 of both the front and rear cylinder devices 52, 62 from their neutral positions, caused by the thermal expansion of the working liquid, are effectively restrained.

Next, there will be described a second embodiment of the present invention that also relates to a suspension system for use in a vehicle. However, the second embodiment differs from the first embodiment, with respect to only a portion of its hardware construction, and the second embodiment is identical with the first embodiment, with respect to the remaining portion of its hardware construction and the entirety of its software construction. Therefore, the following description relates to only different portions of the second embodiment from the first embodiment, and the same reference numerals as used in the first embodiment are used to designate the corresponding elements and parts of the second embodiment. A redundant description of those elements and parts is omitted.

Figure 7:
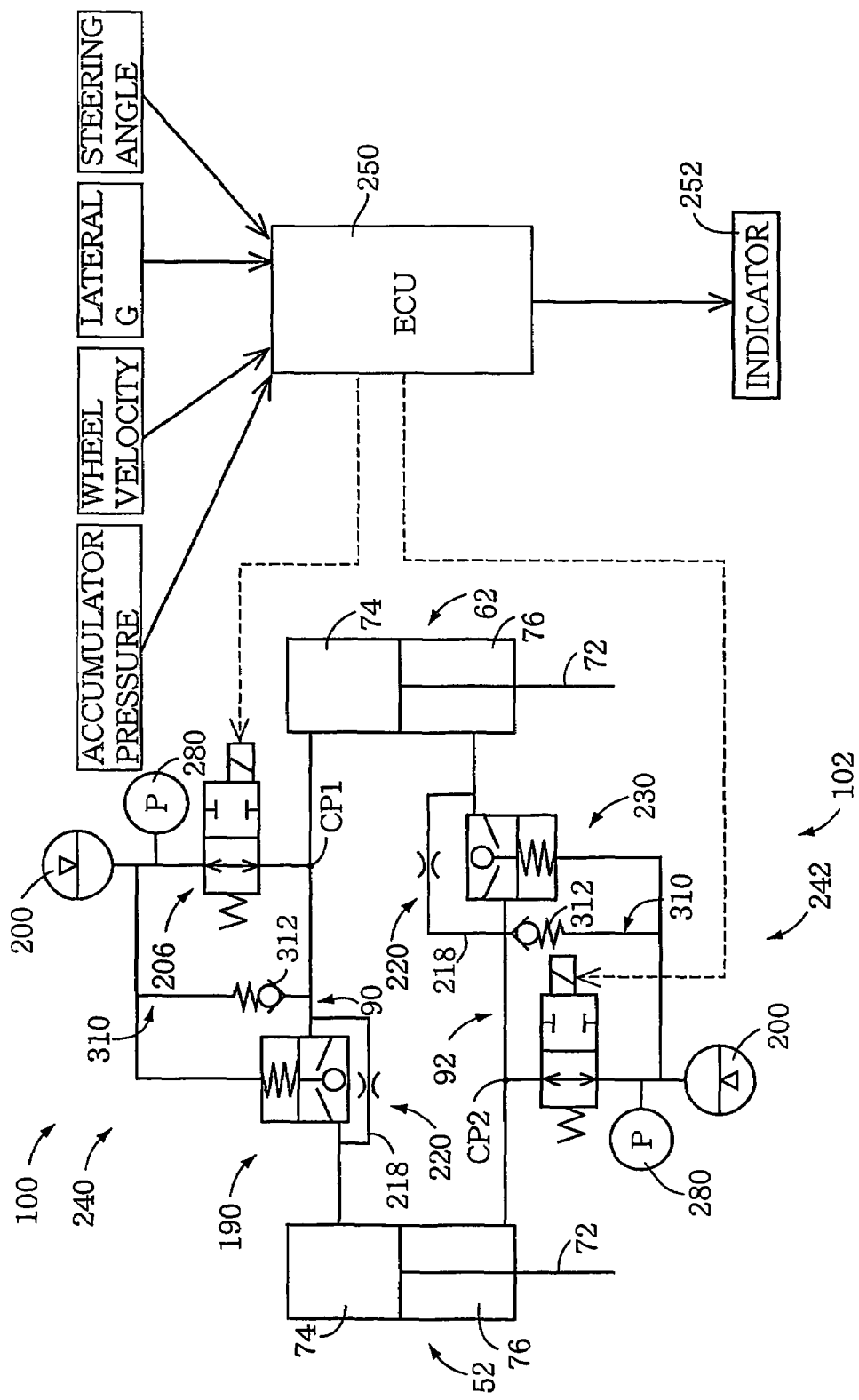
FIG. 7 is a diagrammatic view corresponding to FIG. 4, for explaining conceptually a hardware construction of another suspension system as a second embodiment of the present invention, including two pressure circuits of the system.

In the second embodiment, as shown in FIG. 7, the two solenoid valves 206, 206 are associated with respective relief passages 310, 310 which bypass the same 206, 206, and a relief valve 312 is provided in each of the relief passages 310, 310. When the pressure in each of the first and second passages 90, 92 exceeds a relief pressure, i.e., a valve opening pressure of a corresponding one of the two relief valves 312, the one relief valve 312 is opened so that the each passage 90, 92 is allowed to communicate with a corresponding one of the two accumulators 200 via the one relief valve 312 being opened, while bypassing a corresponding one of the solenoid valves 206.

Therefore, in the second embodiment, in case each one of the solenoid valves 206 may be locked or stuck at its closed position, a corresponding one of the relief valves 312 is opened when the pressure in a corresponding one of the front and rear cylinder devices 52, 62 exceeds, because of the thermal expansion of the working liquid, the valve opening pressure of the one relief valve 312. Thus, the pressure in each of the two cylinder devices 52, 62 is prevented from being excessively increased.

Next, there will be described a third embodiment of the present invention that also relates to a suspension system for use in a vehicle. However, the third embodiment differs from the first embodiment, with respect to only a portion of its hardware construction, and the third embodiment is identical with the first embodiment, with respect to the remaining portion of its hardware construction and the entirety of its software construction. Therefore, the following description relates to only different portions of the third embodiment from the first embodiment, and the same reference numerals as used in the first embodiment are used to designate the corresponding elements and parts of the third embodiment. A redundant description of those elements and parts is omitted.

In the first embodiment, as shown in FIG. 2, each of the front and rear cylinder devices 52, 62 includes the piston rod 80 which is located in not the upper chamber 74, but the lower chamber 76 only. Therefore, the upper and lower chambers 74, 76 have the different volume-to-stroke conversion rates.

Figure 8:
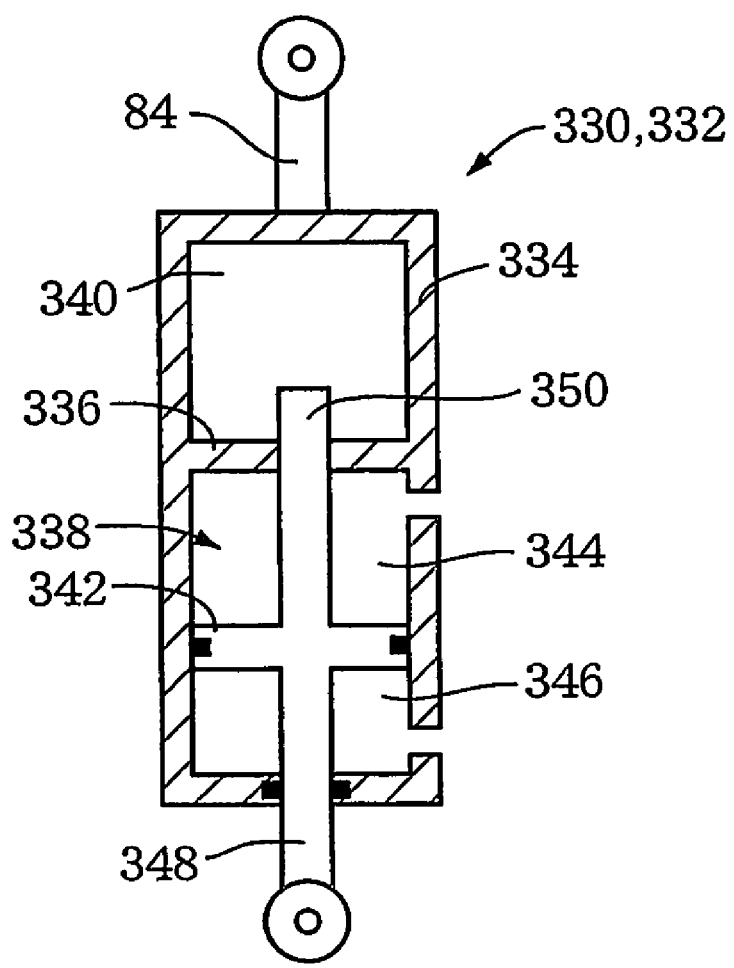
FIG. 8 is a cross-sectioned, front elevation view corresponding to FIG. 2, for showing another cylinder device of another suspension system as a third embodiment of the present invention.

In contrast, in the third embodiment, the front and rear cylinder devices 52, 62 employed in the first embodiment are replaced with a front cylinder device 330 and a rear cylinder device 332, respectively, shown in FIG. 8. Each of the two cylinder devices 330, 332 includes a housing 334 having a partition wall 336 which divides an inner space of the housing 334 into a control chamber 338 which accommodates a working liquid, and an atmospheric-pressure chamber 340 whose pressure is equal to an atmospheric pressure. A piston 342 divides the control chamber 338 into an upper chamber 344 and a lower chamber 346.

Two piston rods 348, 350 extend from opposite surfaces of the piston 342, respectively, coaxially with the same 342 and in opposite directions, respectively. The lower piston rod 348 extends through a lower wall of the housing 334 and projects into an outside space, and an end portion of the projecting portion of the lower piston rod 348 is connected to a prescribed portion of a corresponding one of the front and rear stabilizer bars 30, 32. On the other hand, the upper piston rod 350 extends through the partition wall 336, and projects into the atmospheric-pressure chamber 340.

In each of the front and rear cylinder devices 330, 332, the upper and lower chambers 344, 346 have a same volume-to-stroke conversion rate.

In the first embodiment, the upper chamber 74 of the front cylinder device 52 is preferably connected to the mechanical valve 190 such that the mechanical valve is located between the upper chamber 74 of the front cylinder device 52 and the first accumulator 200, for the purpose of effectively restraining the amount of deviation of the piston rod 80 of the front cylinder device 52 from its nominal neutral position, as described above. Even though this connection manner may be deemed as a limitation to the first embodiment, the third embodiment is free of this limitation, because either the upper chamber 344 or the lower chamber 346 of the front cylinder device 330 can be preferably connected to the mechanical valve 190 such that the mechanical valve 190 is located between the upper or lower chamber 344, 346 of the front cylinder device 330 and the first accumulator 200, for the purpose of effectively restraining the amount of deviation of the piston rod 348 of the front cylinder device 330 from its nominal neutral position. Therefore, in the third embodiment, a degree of freedom of layout of the mechanical valves 190, 230 is improved.

Figure 9:
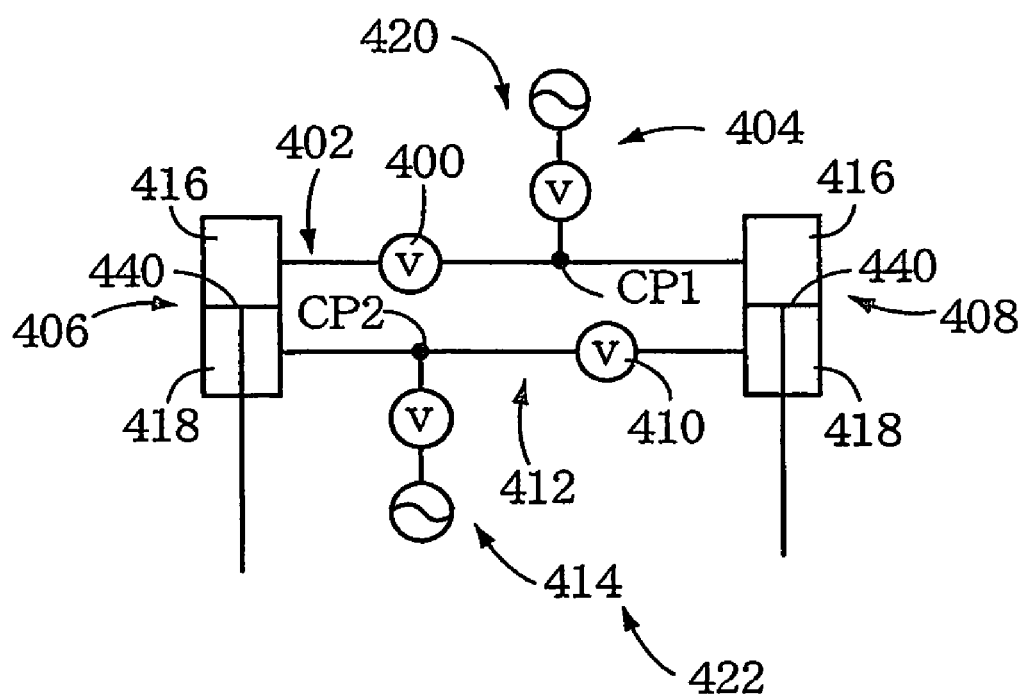
FIG. 9 is a diagrammatic view for explaining conceptually a pressure circuit of an example of a suspension system according to the present invention.
Figure 10:
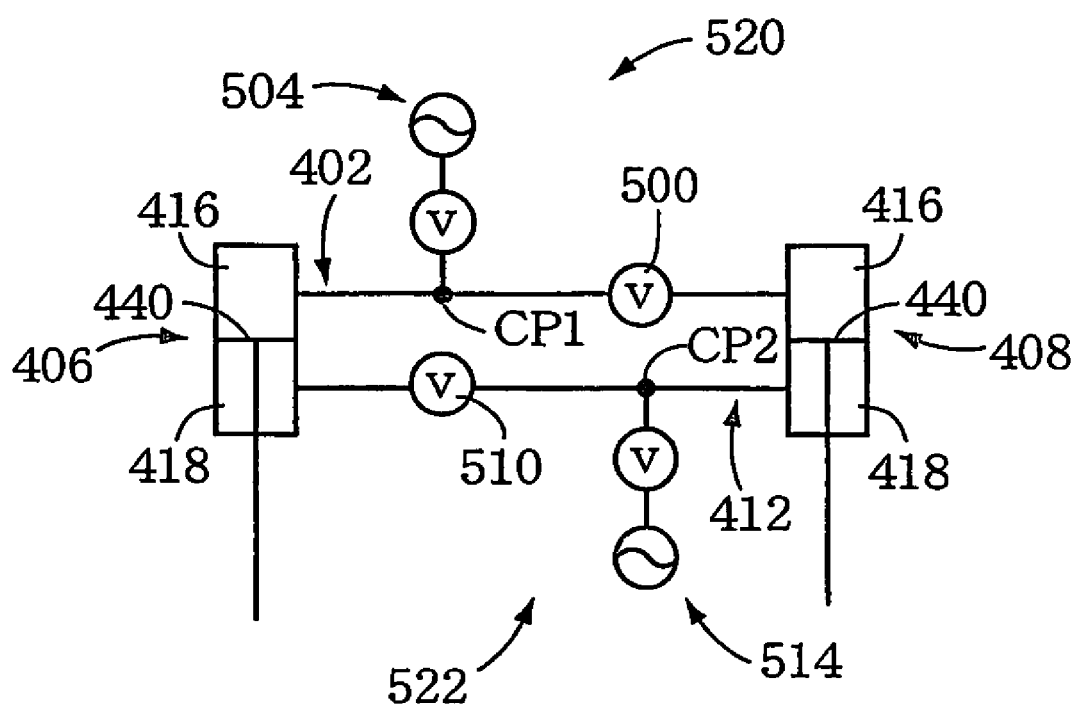
FIG. 10 is a diagrammatic view corresponding to FIG. 9, for explaining conceptually a pressure circuit of another suspension system as a fourth embodiment of the present invention.

FIG. 10 conceptually shows a pressure circuit 520, 522 of another suspension system as a fourth embodiment of the present invention. The fourth embodiment differs from the first embodiment shown in FIG. 9, in that a first-chamber-associated valve device 500 is provided in one 184 (FIG. 1) of two portions 180, 184 of a first-chamber-associated passage 402 that is nearer than the other portion 180 to a rear-wheel-associated cylinder device 408, and a first fluid accommodating device 504 is connected, at a first connection point PC1, to the other portion 180 of the first-chamber-associated passage 402; and a second-chamber-associated valve device 510 is provided in one 180 of two portions 180, 184 of a second-chamber-associated passage 412 that is nearer than the other portion 184 to a front-wheel-associated cylinder device 406, and a second fluid accommodating device 514 is connected, at a second connection point PC2, to the other portion 184 of the second-chamber-associated passage 412.

Figure 11:
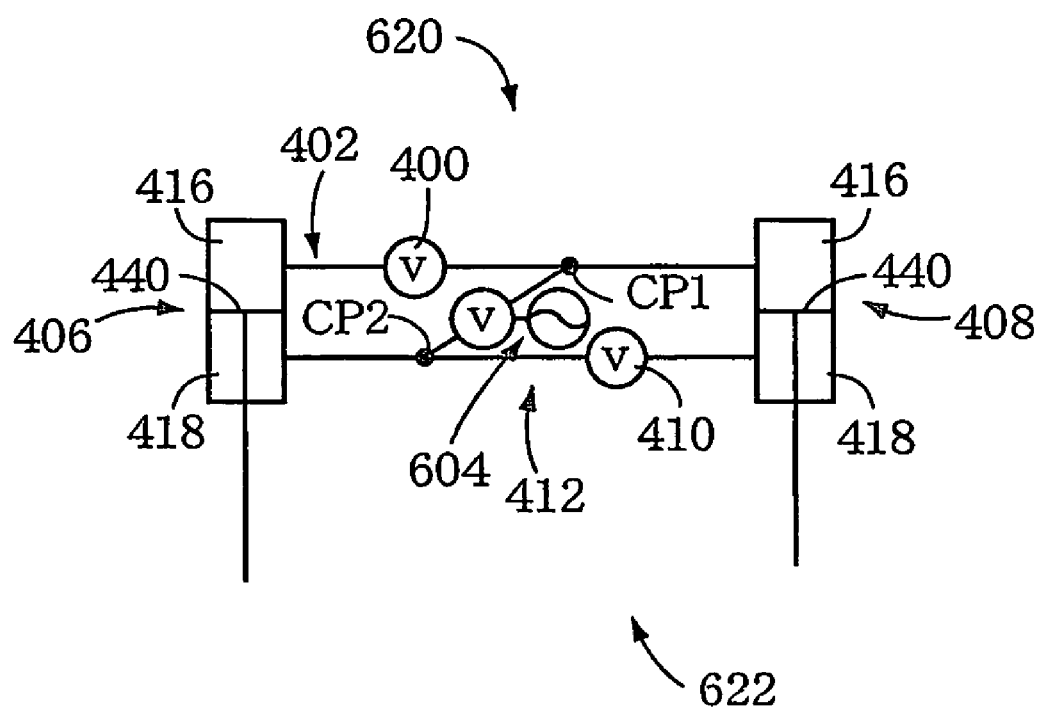
FIG. 11 is a diagrammatic view corresponding to FIG. 9, for explaining conceptually a pressure circuit of yet another suspension system as a fifth embodiment of the present invention.
Figure 12:
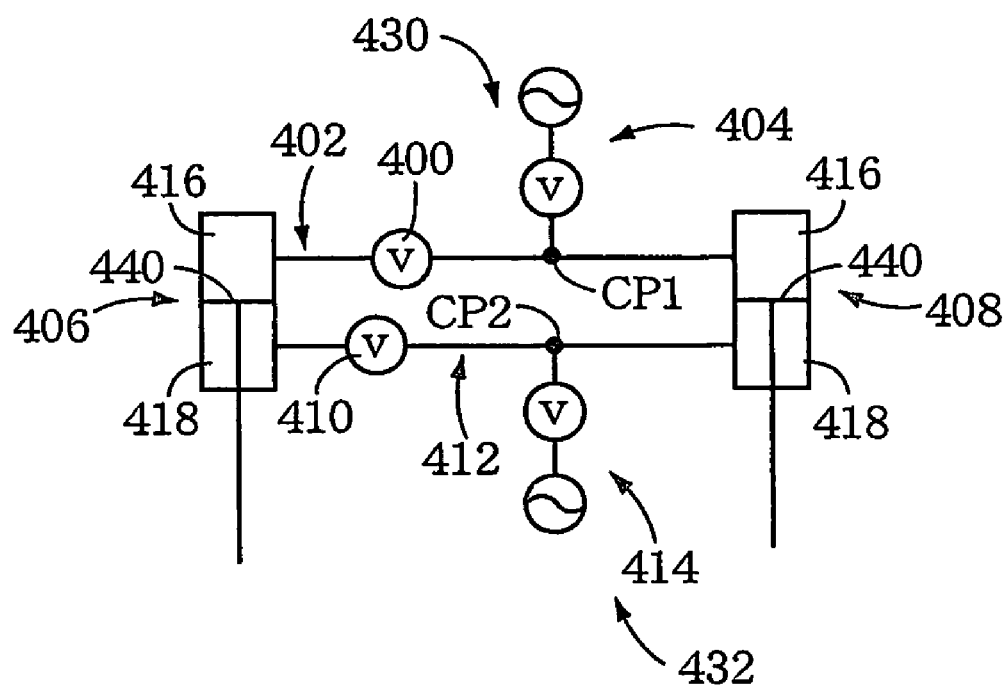
FIG. 12 is a diagrammatic view corresponding to FIG. 9, for explaining conceptually a pressure circuit of a suspension system as a comparative example.

FIG. 11 conceptually shows a pressure circuit 620, 622 of yet another suspension system as a fifth embodiment of the present invention. The fifth embodiment differs from the first embodiment shown in FIG. 9, in that a single common fluid accommodating device 614 including a single accumulator 200 (FIG. 3) and a single solenoid valve 206 is connected, at a first connection point PC1, to a first-chamber-associated passage 402, and is additionally connected, at a second connection point PC2, to a second-chamber-associated passage 412.

While the present invention has been described in detail in its several embodiments by reference to the drawings, it is to be understood that the present invention is not limited to the details of those embodiments and may be embodied with various changes and improvements, such as those described in DISCLOSURE OF THE INVENTION, that may occur to a person skilled in the art.

The invention claimed is:

1. A suspension system for use in a vehicle including a body, left and right front wheels, and left and right rear wheels, the system comprising:
    a front-wheel-associated cylinder device which controls a relative displacement between the left and right front wheels in upward and downward directions, and which includes a housing and a piston fitted in the housing to divide an inner room of the housing into a first fluid chamber and a second fluid chamber;
    a rear-wheel-associated cylinder device which controls a relative displacement between the left and right rear wheels in the upward and downward directions, and which includes a housing and a piston fitted in the housing to divide an inner room of the housing into a first fluid chamber and a second fluid chamber which correspond to the first and second fluid chambers of the front-wheel-associated cylinder device, respectively;
    a first-chamber-associated passage which connects between the respective first fluid chambers of the front-wheel-associated and rear-wheel-associated cylinder devices;
    a second-chamber-associated passage which connects between the respective second fluid chambers of the front-wheel-associated and rear-wheel-associated cylinder devices;
    at least one fluid accommodating device which is connected to the first-chamber-associated passage at a first connection point (CP1), and is connected to the second-chamber-associated passage at a second connection point (CP2), and which can accommodate an amount of a working fluid present in the first-chamber-associated and second-chamber-associated passages and the front-wheel-associated and rear-wheel-associated cylinder devices, the first-chamber-associated passage including two portions located on opposite sides of the first connection point, respectively, the second-chamber-associated passage including two portions located on opposite sides of the second connection point, respectively;
    a first-chamber-associated valve device which is selectively placed in a communication position to communicate the respective first fluid chambers of the front-wheel-associated and rear-wheel-associated cylinder devices, with each other, and a shut-off position to shut off the communication between said respective first fluid chambers;
    a second-chamber-associated valve device which is selectively placed in a communication position to communicate the respective second fluid chambers of the front-wheel-associated and rear-wheel-associated cylinder devices, with each other, and a shut-off position to shut off the communication between said respective second fluid chambers; and
    the first-chamber-associated valve device being provided in one of the two portions of the first-chamber-associated passage that is nearer than the other portion to a first cylinder device as one of the front-wheel-associated and rear-wheel-associated cylinder devices, the second-chamber-associated valve device being provided in one of the two portions of the second-chamber-associated passage that is nearer than the other portion to a second cylinder device as the other of the front-wheel-associated and rear-wheel-associated cylinder devices.

2. The system according to claim 1, wherein a conversion rate at which an amount of change of a volume of the first fluid chamber of the front-wheel-associated cylinder device is converted into an amount of displacement of a piston of the front-wheel-associated cylinder device, is smaller than a conversion rate at which an amount of change of a volume of the second fluid chamber of the front-wheel-associated cylinder device is converted into an amount of displacement of the piston of the front-wheel-associated cylinder device, and wherein the first cylinder device comprises the front-wheel-associated cylinder device, so that the first-chamber-associated valve device is provided in the one portion of the first-chamber-associated passage that is nearer to the front-wheel-associated cylinder device.

3. The system according to claim 1, wherein a conversion rate at which an amount of change of a volume of the first fluid chamber of the rear-wheel-associated cylinder device is converted into an amount of displacement of a piston of the rear-wheel-associated cylinder device, is smaller than a conversion rate at which an amount of change of a volume of the second fluid chamber of the rear-wheel-associated cylinder device is converted into an amount of displacement of the piston of the rear-wheel-associated cylinder device, and wherein the first cylinder device comprises the rear-wheel-associated cylinder device, so that the first-chamber-associated valve device is provided in the one portion of the first-chamber-associated passage that is nearer to the rear-wheel-associated cylinder device.

4. The system according to claim 1, further comprising:
a first-chamber-associated bypass passage which communicates the respective first fluid chambers of the front-wheel-associated and rear-wheel-associated cylinder devices, with each other, while substantially bypassing the first-chamber-associated valve device; and
a second-chamber-associated bypass passage which communicates the respective second fluid chambers of the front-wheel-associated and rear-wheel-associated cylinder devices, with each other, while substantially bypassing the second-chamber-associated valve device.

5. The system according to claim 4, further comprising:
a first flow restrictor which is provided in the first-chamber-associated bypass passage and restricts a flow of the working fluid in the first-chamber-associated bypass passage; and
a second flow restrictor which is provided in the second-chamber-associated bypass passage and restricts a flow of the working fluid in the second-chamber-associated bypass passage.

6. The system according to claim 1, wherein the at least one fluid accommodating device comprises:
at least one accumulator which can accommodate the amount of the working fluid present in the first-chamber-associated and second-chamber-associated passages and the front-wheel-associated and rear-wheel-associated cylinder devices; and
at least one accumulator-associated valve which is selectively placed in a communication position to communicate the at least one accumulator with the first-chamber-associated and second-chamber-associated passages, and in a shut-off position to shut off the communication between the at least one accumulator and the first-chamber-associated and second-chamber-associated passages.

7. The system according to claim 6, further comprising at least one relief passage which relieves the amount of the working fluid from the first-chamber-associated and second-chamber-associated passages into the at least one accumulator, while substantially bypassing the at least one accumulator-associated valve.

8. The system according to claim 7, further comprising at least one relief valve which is provided in the at least one relief passage and which is opened when a pressure of the working fluid present in the first-chamber-associated and second-chamber-associated passages exceeds a reference value, so that the amount of the working fluid flows from the first-chamber-associated and second-chamber-associated passages into the at least one accumulator, while substantially bypassing the at least one accumulator-associated valve.

9. The system according to claim 6, wherein the at least one accumulator-associated valve is normally placed in the communication position.

10. The system according to claim 6, comprising two the accumulator-associated valves which are associated with the first-chamber-associated and second-chamber-associated passages, respectively.

11. The system according to claim 10, comprising two the accumulators which are associated with the first-chamber-associated and second-chamber-associated passages, respectively.

12. The system according to claim 6, wherein the one accumulator-associated valve is commonly associated with the first-chamber-associated and second-chamber-associated passages.

13. The system according to claim 12, wherein the one accumulator is commonly associated with the first-chamber-associated and second-chamber-associated passages.

14. The system according to claim 1,
wherein the first-chamber-associated passage connects between a pair of first fluid chambers as the respective first fluid chambers of the front-wheel-associated and rear-wheel-associated cylinder devices, and the second-chamber-associated passage connects between a pair of second fluid chambers as the respective second fluid chambers of the front-wheel-associated and rear-wheel-associated cylinder devices, and
wherein at least one of (A) the first-chamber-associated valve device and (B) the second-chamber-associated valve device comprises a mechanical valve which is mechanically switched between a communication position to communicate a corresponding one pair of (C) the pair of first fluid chambers and (D) the pair of second fluid chambers, with each other, and a shut-off position to shut off the communication between the corresponding pair of fluid chambers, with a cylinder pressure based on respective pressures of the respective working fluids in the corresponding pair of fluid chambers.

15. The system according to claim 14, wherein the first-chamber-associated valve device comprises a first-chamber-associated mechanical valve which is mechanically switched between a communication position to communicate the pair of first fluid chambers with each other, and a shut-off position to shut off the communication between the pair of first fluid chambers, with a first cylinder pressure based on respective pressures of the respective working fluids in the pair of first chambers, and the second-chamber-associated valve device comprises a second-chamber-associated mechanical valve which is mechanically switched between a communication position to communicate the pair of second fluid chambers with each other, and a shut-off position to shut off the communication between the pair of second fluid chambers, with a second cylinder pressure based on respective pressures of the respective working fluids in the pair of second chambers.

16. The system according to claim 15, wherein each of the first-chamber-associated mechanical valve and the second-chamber-associated mechanical valve is normally placed in the communication position thereof and, when a corresponding one of the first and second cylinder pressures exceeds a reference value, the each mechanical value is switched from the communication position to the shut-off position.

17. The system according to claim 16, wherein the each of the first-chamber-associated mechanical valve and the second-chamber-associated mechanical valve comprises:
- a housing;
- a valve portion including a valve member and a valve seat which comprise a first movable member;
- a second movable member which is movable with the first movable member and which is fitted in the housing to divide an inner room of the housing into a first room on the side of the valve portion and a second room opposite to the first room; and
- a biasing device which biases at least one of the first movable member and the second movable member in direction in which the valve member and the valve seat are moved away from each other.

18. The system according to claim 17, wherein the working fluid comprises a working liquid,
- wherein the at least one fluid accommodating device can accommodate an amount of the working liquid, and
- wherein the second room of the each mechanical valve is connected to the at least one fluid accommodating device.

19. The system according to claim 1, further comprising:
- a front stabilizer bar which connects between the left and right front wheels; and
- a rear stabilizer bar which connects between the left and right rear wheels,
- wherein the front-wheel-associated cylinder device is provided between the front stabilizer bar and the body, and the rear-wheel-associated cylinder device is provided between the rear stabilizer bar and the body.

20. The system according to claim 19, further comprising:
- a front connection rod whose length is unchangeable and which is provided, in parallel with the front-wheel-associated cylinder device, between the front stabilizer bar and the body; and
- a rear connection rod whose length is unchangeable and which is provided, in parallel with the rear-wheel-associated cylinder device, between the rear stabilizer bar and the body.

21. A suspension system for use in a vehicle including a body, left and right front wheels, and left and right rear wheels, the system comprising:
- a front-wheel-associated cylinder device which controls a relative displacement between the left and right front wheels in upward and downward directions, and which includes a housing and a piston fitted in the housing to divide an inner room of the housing into a first fluid chamber and a second fluid chamber;
- a rear-wheel-associated cylinder device which controls a relative displacement between the left and right rear wheels in the upward and downward directions, and which includes a housing and a piston fitted in the housing to divide an inner room of the housing into a first fluid chamber and a second fluid chamber which correspond to the first and second fluid chambers of the front-wheel-associated cylinder device, respectively;
- a first-chamber-associated passage which connects between a pair of first fluid chambers as the respective first fluid chambers of the front-wheel-associated and rear-wheel-associated cylinder devices;
- a second-chamber-associated passage which connects between a pair of second fluid chambers as the respective second fluid chambers of the front-wheel-associated and rear-wheel-associated cylinder devices; and
- at least one of (A) a first-chamber-associated valve device which is selectively placed in a communication position to communicate the pair of first fluid chambers with each other, and a shut-off position to shut off the communication between the pair of first fluid chambers, and (B) a second-chamber-associated valve device which is selectively placed in a communication position to communicate the pair of second fluid chambers with each other, and a shut-off position to shut off the communication between the pair of second fluid chambers,
- wherein the at least one of (A) the first-chamber-associated valve device and (B) the second-chamber-associated valve device comprises a mechanical valve which is mechanically switched between a communication position to communicate a corresponding one pair of (C) the pair of first fluid chambers and (D) the pair of second fluid chambers, with each other, and a shut-off position to shut off the communication between the corresponding pair of fluid chambers, with a cylinder pressure based on respective pressures of respective working fluids in the corresponding pair of fluid chambers.

22. The suspension system according to claim 21,
comprising the first-chamber-associated valve device and the second-chamber-associated valve device, the
wherein the first-chamber-associated valve device comprises a first-chamber-associated mechanical valve which is mechanically switched between a communication position to communicate the pair of first fluid chambers with each other, and a shut-off position to shut off the communication between the pair of first fluid chambers, with a first cylinder pressure based on respective pressures of the respective working fluids in the pair of first chambers, and
the second-chamber-associated valve device comprises a second-chamber-associated mechanical valve which is mechanically switched between a communication position to communicate the pair of second fluid chambers with each other, and a shut-off position to shut off the communication between the pair of second fluid chambers, with a second cylinder pressure based on respective pressures of respective working fluids in the pair of second chambers.

23. The system according to claim 22, wherein each of the first-chamber-associated mechanical valve and the second-chamber-associated mechanical valve is normally placed in the communication position thereof and, when a corresponding one of the first and second cylinder pressures exceeds a reference value, the each mechanical valve is switched from the communication position to the shut-off position.

24. The system according to claim 23, wherein the each of the first-chamber-associated mechanical valve and the second-chamber-associated mechanical valve comprises:
- a housing;
- a valve portion including a valve member and a valve seat which comprise a first movable member;
- a second movable member which is movable with the first movable member and which is fitted in the housing to divide an inner room of the housing into a first room on the side of the valve portion and a second room opposite to the first room; and
- a biasing device which biases at least one of the first movable member and the second movable member in a direction in which the valve member and the valve seat are moved away from each other.

25. The system according to claim 21, further comprising at least one fluid accommodating device which communicates with at least one of the front-wheel-associated and rear-wheel-associated cylinder devices, and can accommodate an amount of a working fluid present in the at least one of the front-wheel-associated and rear-wheel-associated cylinder devices.

* * * * *